United States Patent
Deliwala et al.

[11] Patent Number: 6,020,988
[45] Date of Patent: Feb. 1, 2000

[54] ULTRA HIGH RESOLUTION WAVE FOCUSING METHOD AND APPARATUS AND SYSTEMS EMPLOYING SUCH METHOD AND APPARATUS

[75] Inventors: Shrenik Deliwala, Brighton; Allen Flusberg, Newton, both of Mass.

[73] Assignee: Science Research Laboratory, Inc., Somerville, Mass.

[21] Appl. No.: 09/128,611

[22] Filed: Aug. 3, 1998

Related U.S. Application Data

[60] Provisional application No. 60/054,729, Aug. 5, 1997.

[51] Int. Cl.⁷ ........................................................ G02F 1/01
[52] U.S. Cl. .......................... 359/276; 246/264; 246/562; 246/558; 382/124; 73/614
[58] Field of Search ...................................... 359/276, 246, 359/238, 263, 264, 711, 562, 558; 382/124; 73/614, 602

[56] References Cited

U.S. PATENT DOCUMENTS

| | | | |
|---|---|---|---|
| 5,148,315 | 9/1992 | Tamari | 359/558 |
| 5,450,237 | 9/1995 | Yoshida et al. | 359/562 |
| 5,493,438 | 2/1996 | Gay et al. | 359/246 |
| 5,496,995 | 3/1996 | Kato et al. | 250/216 |
| 5,587,533 | 12/1996 | Schneider et al. | 73/614 |
| 5,615,050 | 3/1997 | Kant | 359/711 |
| 5,625,613 | 4/1997 | Kato et al. | 369/112 |
| 5,689,576 | 11/1997 | Schneider et al. | 382/124 |

OTHER PUBLICATIONS

H. Fukuda et al., Can Synthetic Aperture Techniques be Applied to Optical Lithography, J. Vsc.Sci.Tech. B 14(6), Nov./Dec. 1996, pp. 4162–4166.

M. Schrader et al., Optical Transfer Functions of 4P1 Confocal Microscopes: Theory and Experiment, Optics Letters/Vo. 22, No. 7, Apr. 1, 1997, pp. 436–438.

*Primary Examiner*—Loha Ben
*Attorney, Agent, or Firm*—Wolf, Greenfield & Sacks, P.C.

[57] ABSTRACT

An ultra high resolution wave focusing method and apparatus is disclosed. The invention provides a focusing system having an effective numerical aperture greater than that possible using known conventional focusing techniques. By the method and apparatus of the invention, a wave of arbitrary wavefront profile and wavelength $\lambda$ is focused to a region of high amplitude having a spot size that approaches the fundamental limit of $0.25\lambda$. Imaging and patterning systems employing such a wave focusing method and apparatus provide ultra high resolution and ultra small feature sizes beyond the capabilities of systems utilizing conventional focusing elements.

76 Claims, 16 Drawing Sheets

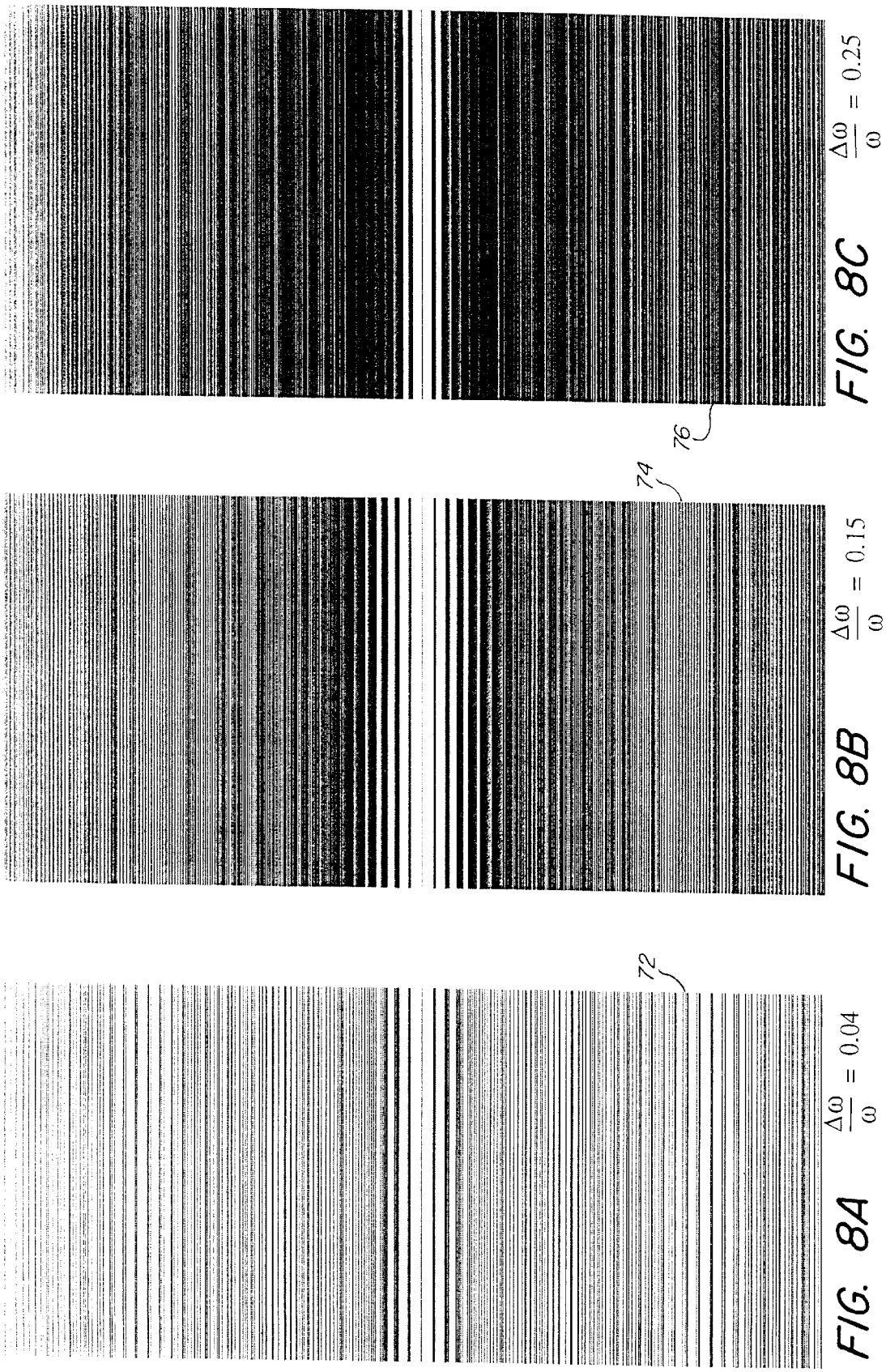

ULTRA HIGH RESOLUTION WAVE FOCUSING METHOD AND APPARATUS AND SYSTEMS EMPLOYING SUCH METHOD AND APPARATUS

RELATED APPLICATIONS

This application claims priority from provisional specification Ser. No. 60/054,729 filed Aug. 5, 1997, the subject matter of which is incorporated herein by reference.

FIELD OF THE INVENTION

This invention relates to the physical properties of wave phenomena, and more particularly to a method and apparatus for focusing waves to one or more small regions of high amplitude having physical dimensions that approach a fundamental limit.

BACKGROUND OF THE INVENTION

Various methods and apparatus for focusing waves are known. Basic principles of wave physics suggest a fundamental minimal limit for the dimension of a high amplitude region or "spot" to which a wave is focused. In practice, it is difficult to approach this fundamental minimal limit due to the physical characteristics of various elements used to focus a wave. A well-known limit to wave focusing arising from the finite dimensions of a focusing element is referred to as the diffraction limit.

Super-resolution techniques for achieving a reduced focus spot size smaller than a diffraction limited spot size involve placing slit-like or annular apertures in a wave path. The wave is diffracted from two apertures formed in a light intercepting plane which present an intensity distribution in a plane beyond the apertures. Such an intensity distribution is a well-known diffraction interference pattern. The diffraction pattern comprises a main high intensity lobe flanked on either side by a series of "sidelobes" having a decreasing intensity as a function of the distance from the main lobe. The spot size of the main lobe of the diffraction pattern is smaller than the diffraction limited spot size of a wave passing through a single aperture. However, the presence of the sidelobes is undesirable for many applications, because they limit the resolving ability of the main lobe spot.

Other super-resolution approaches to wave focusing employ various filtering or masking techniques near the face of an interference or "focal" plane to reduce the presence of sidelobes to a certain extent. However, such techniques typically present a problem in that, while wave energy in the sidelobes is decreased, the amount of wave energy generally reaching the focal plane is also markedly decreased in the central main lobe. Other techniques for suppression of sidelobes involves phase shifting devices, typically in the form of phase plates or zone plates, through which a wave is passed prior to being focused by a focusing element. Such plates induce phase reversals in select spatial portions of a wave, such that the sidelobes of the interference pattern in a focal plane are canceled.

For several optical applications, yet other approaches to reducing a focused wave spot size have been proposed, some of which involve beam obscuration devices. An example of one such approach is hyper-resolution focusing, wherein light is blocked from passing through a central portion of a focusing lens. In this technique, only the light beam passing through the peripheral portion of the lens is focused. In some sense, the peripheral portion acts like an aperture, as described above, and the blocked lens generates a diffraction pattern in which secondary peaks appear on both sides of a primary peak in the focal plane. Similar to the interference pattern from the apertures described above, the primary peak is narrower than when the light is not blocked from passing through the central portion of the lens, but secondary diffraction peaks, or sidelobes, remain in the focal plane.

Accordingly, while known approaches reduce the focus spot size beyond the diffraction limit, they may not provide adequate sidelobe suppression and may additionally require other combinations of techniques for suppression of sidelobes, as discussed above. However, many schemes for reducing sidelobes also reduce wave energy in the central main lobe. Additionally, solutions to wave focusing using complex schemes of focusing elements often reduce a depth of focus of the focusing system. Depth of focus refers to distance along the direction of wave propagation over which a beam remains focused. For many applications, lens systems having a low depth of focus are a disadvantage, requiring greater focusing precision to properly direct a beam to the medium of a sample.

It is therefore advantageous for a focusing system to be able to focus a wave to a small central spot having a minimum dimension less than the diffraction limited spot size, and more preferably approaching a fundamental minimal limit, without the presence of secondary spots or "sidelobes" which adversely affect the resolution of the central spot. It is further advantageous for such a focusing system to be able to achieve different depths of focus, thereby finding use in various applications benefitting from both high and low depths of focus.

SUMMARY OF THE INVENTION

Accordingly, the present invention provides a method and apparatus for focusing a wave of wavelength $\lambda$ to at least one small central region of high amplitude having at least one dimension that approaches a fundamental minimum limit of $\lambda/4$. By the method and apparatus of the invention, a focusing system applicable to a variety of wavelengths and having a high or low depth of focus is realized, in which sidelobes typical of a diffraction interference pattern are effectively suppressed.

In one embodiment, the invention provides a method and apparatus for wave focusing to a central high amplitude region, wherein at least two wave sources having constant phase relationships with each other and outputting wave packets are directed to the central high amplitude region by a focusing system. The focusing system additionally coherently combines the wave packets of the sources in the central high amplitude region. The wave packets have a sufficient bandwidth so as to substantially reduce secondary high amplitude regions in a vicinity of the central high amplitude region.

In one aspect, the method and apparatus of the invention provides for a focusing system including an arrangement of dispersive elements to spatially redistribute a spectrum of the sources so as to reduce the sufficient bandwidth.

In another aspect, the invention provides a method and apparatus in which the wave packets of each source propagate such that they intersect a focal plane of the central high amplitude region at a non-zero incident angle with respect to a normal to the focal plane. The non-zero incident angle may be equal for each source, or each source may intersect the focal plane at a unique angle. The incident angles are chosen such that a spatial redistribution of a spectrum of the sources reduces the sufficient bandwidth.

In another aspect, the method and apparatus of the invention provides for sources having constant phase relationships by further including a primary wave source and at least one splitter to divide the primary wave source into at least two wave sources.

In another aspect, the invention provides a method and apparatus in which the at least one splitter and the focusing system are arranged so that the wave packets of each source travel an identical path length to the high amplitude region. Such an arrangement ensures that the wave packets will be coherently combined in the high amplitude region.

In another aspect, the invention provides a method and apparatus in which at least one wave source includes a spatial pattern so that a corresponding pattern is produced in the central high amplitude region. In yet another aspect, at least two wave sources each include a different spatial pattern. In yet another aspect, the invention provides at least one spatial modulator to modulate the spatial pattern of at least one of the sources so that at least one high amplitude subregion is moved within the central high amplitude region.

In another aspect, the invention provides a method and apparatus in which a primary wave source includes a spatial pattern so that a corresponding pattern is produced in the central high amplitude region. The spatial pattern may be such that the corresponding pattern is plurality of discreet high amplitude subregions within the central high amplitude region.

In another aspect, the invention provides for a spatial modulator to modulate the spatial pattern of the primary wave source. The modulator may operate, for example, so that at least one high amplitude subregion may be positioned throughout the central high amplitude region.

In another aspect, the invention provides a method and apparatus in which a primary wave source has a Gaussian spatial profile.

In another aspect, the invention provides a method and apparatus in which a laser serves as a primary wave source. In yet another aspect, the wave packets of the laser are pulses. In yet another aspect, the pulses are chirped pulses.

In another aspect, the invention provides a wave focusing method and apparatus employing a high intensity laser beam pulse source having a duration of up to approximately ten picoseconds divided into a plurality of coherent high bandwidth sources, wherein the wave sources are directed and coherently combined to a central high amplitude region having a minimal dimension on the order of 0.3λ.

In another embodiment, the invention provides a method and apparatus in which at least two wave focusing apparatus direct waves to the same central high amplitude region. In a particular example of this embodiment, two wave focusing apparatus are positioned opposite one another in a head-to-head arrangement to achieve a spherical central high amplitude region having a radius approaching the fundamental minimum limit of λ/4.

In another embodiment, the invention provides a material patterning system, including at least one wave focusing apparatus providing a central high amplitude region to a sample, and a translator to move the central high amplitude region throughout the sample in a desired pattern so that portions of the sample exposed to the desired pattern are materially changed. The exposed portions of the sample have a minimum feature size approaching the fundamental minimum limit.

In another embodiment, the invention provides an imaging system, including at least one wave focusing apparatus providing a central high amplitude region to a sample, and a detector to detect radiation from the central high amplitude region of the sample and to generate an image of the sample based on the detected radiation. The generated image has a minimum feature size approaching the fundamental minimum limit.

In another aspect, the invention provides for a material patterning system and an imaging system which employ high intensity wave sources such that a nonlinear process is induced in the material of a sample.

In still another embodiment of the invention, wavelets for at least two sources are coherently combined by a suitable focusing system to form a plurality of high amplitude regions at a focal plane. The high amplitude regions are in a pattern which may be selectively controlled by shutter arrays in the path of the sources.

Other advantages, novel features, and objects of the invention will become apparent from the following detailed description of the invention when considered in conjunction with the accompanying drawings, which are schematic and which are not intended to be drawn to scale. In the drawings, each identical or nearly identical component that is illustrated in various figures is represented by a like numeral. For purposes of clarity, not every component is labeled in every drawing.

BRIEF DESCRIPTION OF THE DRAWINGS

In the drawings:

FIGS. 8A–G are graphic illustrations comparing various source bandwidths and incident angles for the sources of FIG. 6 and the corresponding interference sidelobe distributions;

DETAILED DESCRIPTION

Traveling waves having an arbitrary constant phase wavefront profile may be focused to a small region of high amplitude. The wave may be, for example, a pressure wave such as an acoustic or fluid wave, or an electromagnetic wave such as a radio wave, microwave, optical wave (including infrared, visible, and ultraviolet radiation), an x-ray, etc. The smallest dimension of a focused wave high amplitude region, measured in a focal plane essentially normal to the direction of wave propagation, is often referred to as the "spot size."

One or more lenses may be used to focus a wave. While lenses typically connote uses in connection with vision correction or optics, a lens used to focus a wave of arbitrary wavelength may be considered more generically as a focusing system. For the purposes of this invention, the terms lens and focusing system are therefore used interchangeably.

Essentially, a lens is an arrangement of refracting interfaces which affects the direction and speed of propagation of points along a wavefront. These points may be viewed, for purposes of illustration, as tiny individual wave sources along the wavefront, or "wavelets." A focusing system may be specifically designed using the principles of a lens to alter the direction and speed of the wavelets of the wavefront such that they are combined to focus the wave to a high amplitude spot. Lenses are made in a wide range of forms and from a variety of materials depending on the wavelength of the wave to be focused. Examples of lens materials and forms include, but are not limited to, glass, silica, metals, fabrics, ceramics, waxes, polymers, various membranes and fluids.

Figure 1:
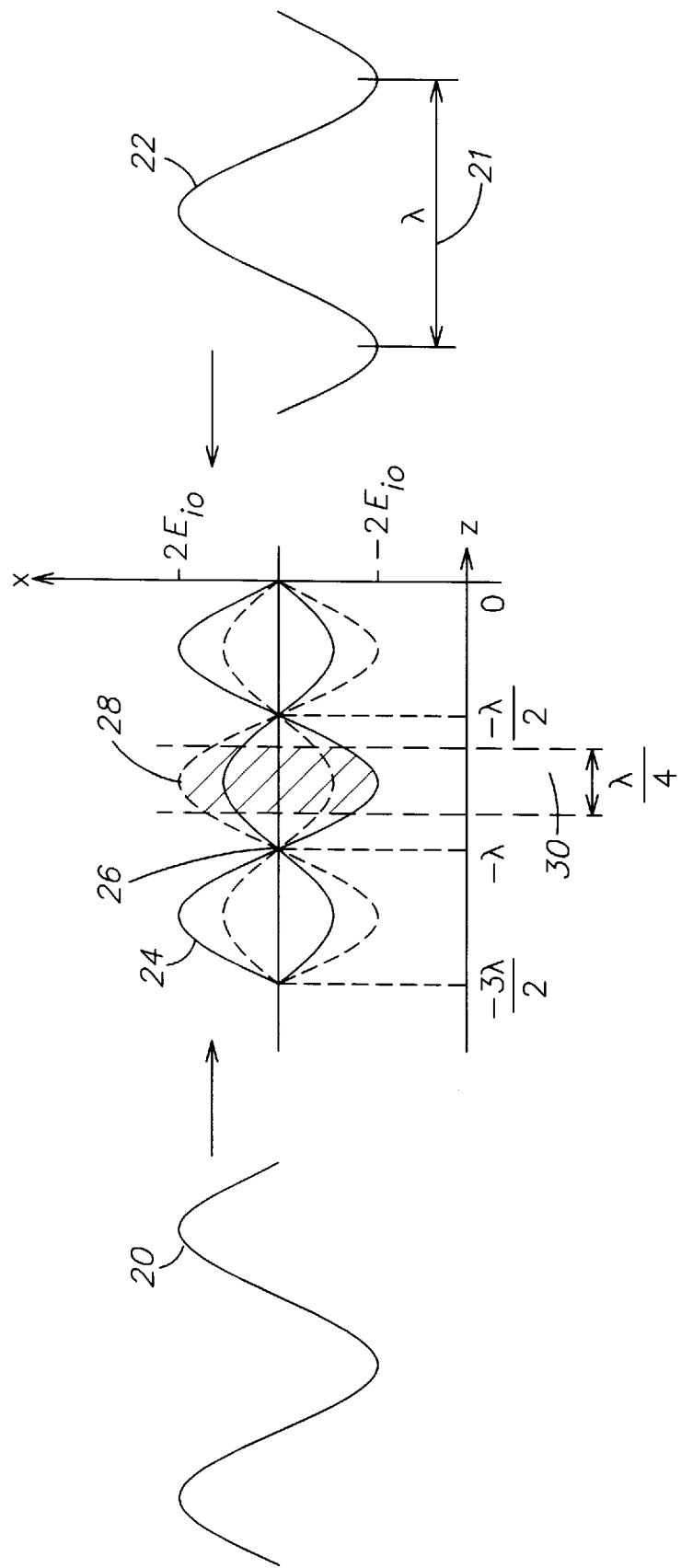
FIG. 1 is a waveform diagram of a standing wave used to illustrate a fundamental limit for a high amplitude spot size.

There is a fundamental limit, however, to the smallest possible focused wave spot size. This limit is illustrated by considering two waves propagating in opposite directions toward the same point. FIG. 1 shows two such waves 20 and 22, wherein each wave has a wavelength $\lambda$ and a planar wavefront, and the phases of the waves are related so that they constructively interfere or "coherently combine" to form a standing wave 24. The standing wave oscillates in time between pairs of nodes 26 separated by a distance of $\lambda/2$. A high amplitude region 30 with a peak 28 occurs between the nodes 26 as a result of the constructive interference.

The energy density of a wave in a medium is proportional to the square of the wave amplitude. The local energy density associated with each of the high amplitude peaks 28 may be described in terms of an effective width or "spot size" of the high amplitude region 30, which, from FIG. 1, is seen to be approximately $\lambda/4$. Since the orientation of wave propagation illustrated in FIG. 1 represents the most geometrically direct means of constructive interference, a fundamental lower limit to spot size is therefore given by $\lambda/4$. It should be noted that the constructive interference depicted in FIG. 1 produces a series of high amplitude spots 30, each separated by a peak-to-peak distance $\lambda/2$ and having a spot size of approximately $\lambda/4$.

Figure 2:
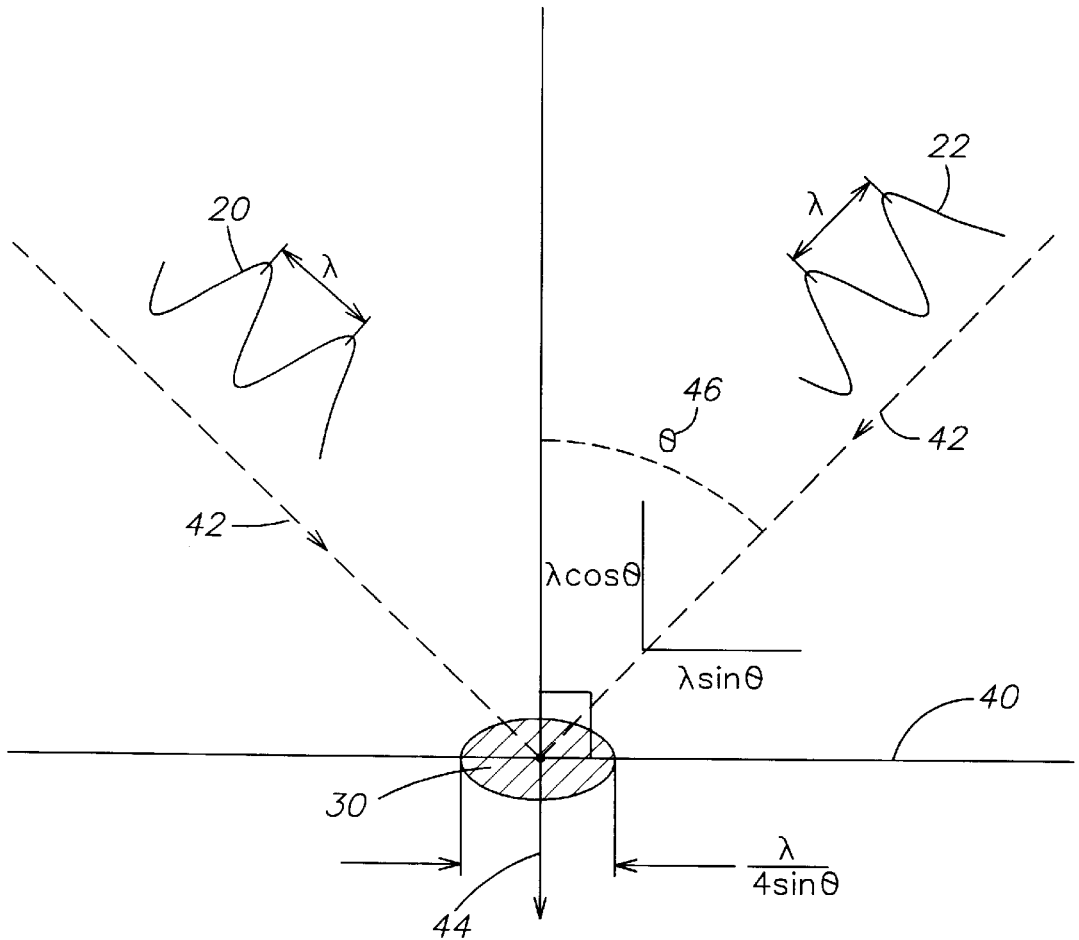
FIG. 2 is a diagram showing the fundamental spot size limit for two waves intersecting a focal plane at an angle with respect to a normal to the plane.

The concepts illustrated in FIG. 1 may be applied to the focusing action of a lens which causes the interference of wavelets along a wavefront of a single wave source. As a practical matter, however, such wavelets will not be propagating toward each other in exactly opposite directions. FIG. 2 shows another arrangement of the two waves 20 and 22 having the appropriate phase relationship so as to constructively interfere to form a central high amplitude region 30 in a focal plane 40. The direction of propagation of each wave is represented by a wavevector 42. A vector sum 44 of the wavevectors 42 represents a normal to the focal plane 40. The waves 20 and 22 are shown to each intersect the focal plane 40 at an angle 46 ($\theta$) with respect to the normal 44. The angle of intersection 46 affects the determination of the size of the central high amplitude spot 30 in the focal plane 40. From FIG. 2, using the component of the wave vectors parallel to the focal plane, it can be seen that this spot size s is given by:

$$s \approx \frac{\lambda}{4\sin\theta}, \tag{1}$$

where an angle of intersection of 90° would represent the arrangement of waves shown in FIG. 1, resulting in a fundamental spot size limit of $\lambda/4$. However, since $\sin\theta$ can never be greater than 1, FIG. 2 demonstrates that the minimum possible spot size of coherently combined waves will necessarily be greater than the fundamental limit of $\lambda/4$ ($0.25\lambda$) for waves that do not propagate in completely opposite directions.

Figure 3:
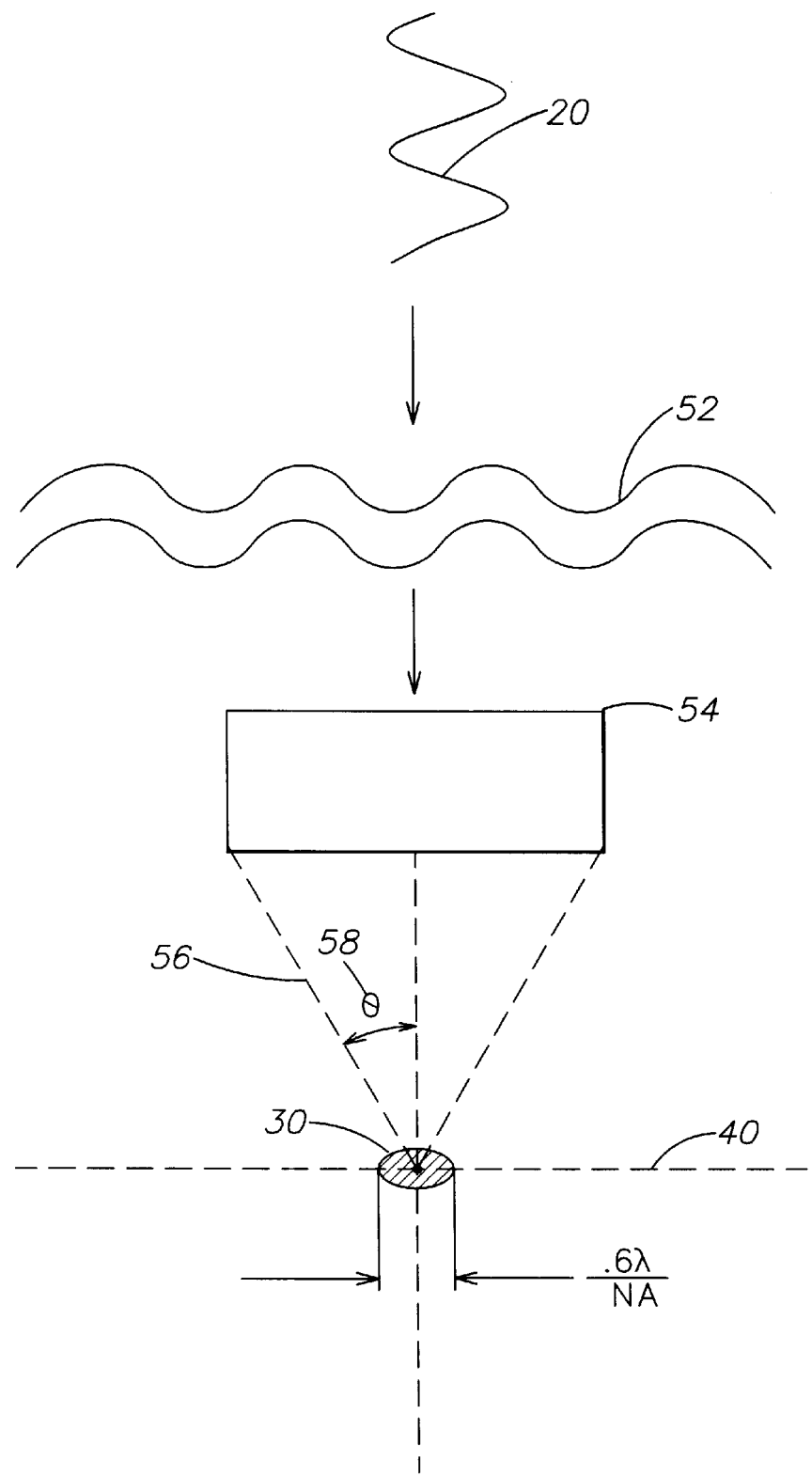
FIG. 3 is a diagram showing the determination of spot size based on the numerical aperture of a lens system used to focus a wave.

The wave geometry depicted in FIG. 2 more closely resembles the interference of wavelets due to the action of a lens. As discussed earlier, a lens coherently combines wavelets along the wavefront of a single wave source to focus the wave to a spot. FIG. 3 shows a wave having a wavefront 52 impinging on a lens 54. Any lens will have some finite dimension that acts as an aperture to limit the ability of the lens to "capture" all of a wavefront. This limit is known as the diffraction limit, and may be described for a given lens by a numerical aperture (NA).

As shown in FIG. 3, the numerical aperture essentially corresponds to the amount of radiation that can be captured by the lens 54 as described by a cone 56 whose apex is the point of focus within the high amplitude spot 30. The numerical aperture is given by:

$$NA = n \sin\theta, \tag{2}$$

where n is a measure of the density of a medium in which the wave 20 is traveling and, in this case, $\theta$ is the half-angle 58 of the lens 54. If the interference of wavelets is compared, for purposes of illustration, to the interference of waves as shown in FIG. 2, the half-angle 58 of the lens is roughly analogous to the angle 46. The spot size s of the focused high amplitude spot 30, taking into consideration the diffraction effects of the lens, may be expressed in terms of numerical aperture by:

$$s \approx \frac{.6\lambda}{NA}. \qquad (3)$$

As seen from Eqs. (2) and (3) and FIG. 3, a larger physical dimension of the lens 54 will result in a larger half-angle 58 and, therefore, a larger numerical aperture NA and a smaller spot size s for a given wavelength λ.

Notwithstanding the dimension of the lens 54 however, from Eq. (2) it can be seen that a numerical aperture greater than 1 may only be achieved for conventional lenses in a medium that is "dense" with respect to the wavelength (n>1). For several wavelength ranges, constructing a lens in a dense medium poses some practical difficulty. In the optical wavelength range, for example, immersion optics techniques for lenses provide an upper limit for numerical aperture of approximately 1.6, which results in a minimum spot size of 0.4λ, according to Eq. (3). To achieve a spot size which approaches the fundamental limit of 0.25λ, however, a numerical aperture of approximately 2.4 would be required.

The invention described herein is directed to a method and apparatus for providing a focusing system having an effective numerical aperture greater than that possible using known conventional focusing techniques. By the method and apparatus of the invention, a wave of arbitrary wavefront profile and wavelength λ is focused to a region of high amplitude having a spot size that approaches the fundamental limit of 0.25λ. Imaging, patterning and other systems employing such a wave focusing method and apparatus provide ultra-high resolution and ultra-small feature sizes beyond the capabilities of systems utilizing conventional focusing elements.

Figure 4:
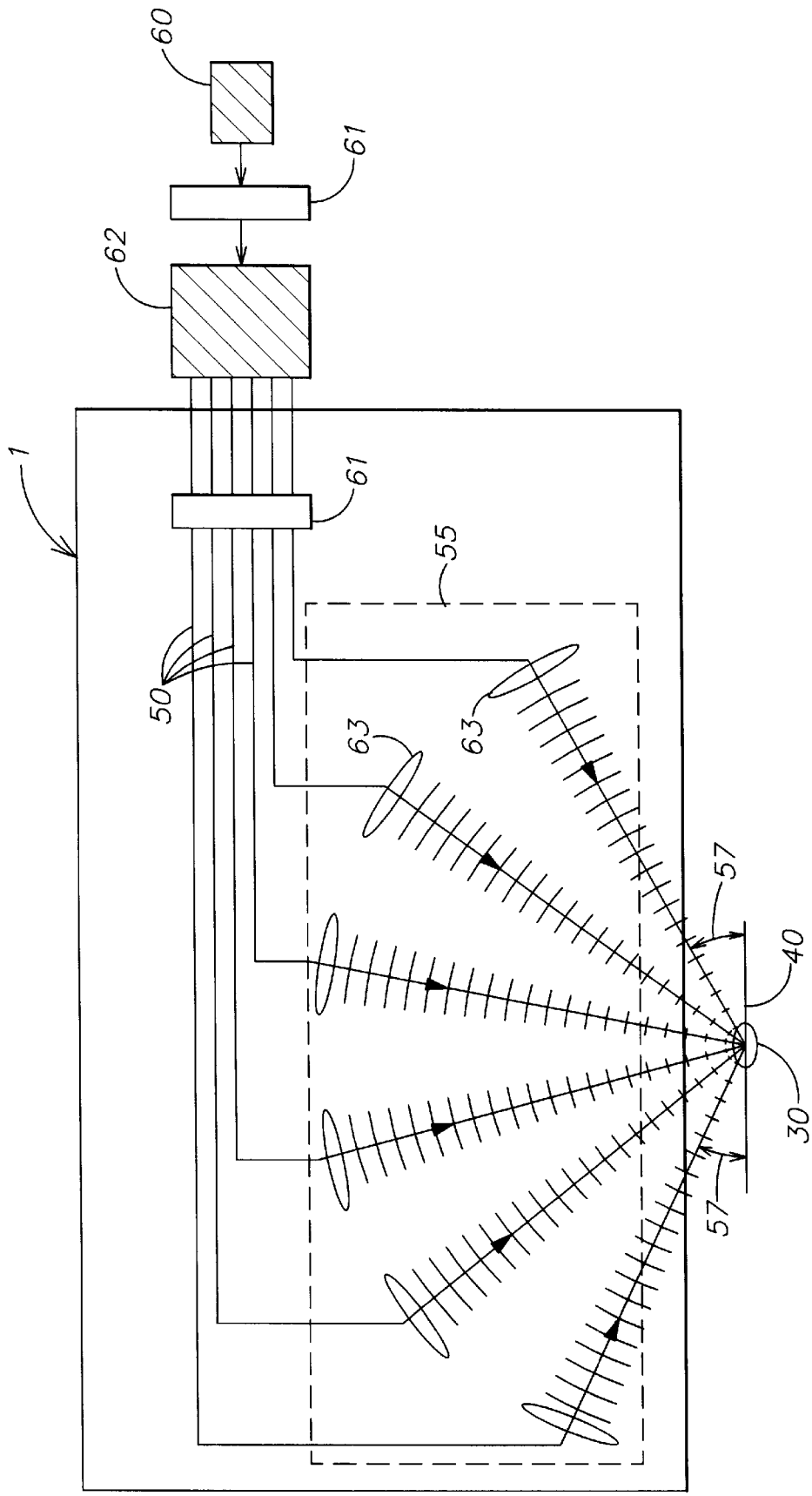
FIG. 4 is a schematic diagram of the apparatus according to the invention.

FIG. 4 shows a general configuration of the elements of a wave focusing apparatus 1 according to the invention. At least two wave sources 50 having constant phase relationships and some spectral bandwidth are directed by a focusing system 55 to a central high amplitude region 30 in a focal plane 40. Examples of sources having constant phase relationships include "phase-locked" or "phased array sources." The wave sources 50 of the apparatus 1 may be provided, for example, by a primary wave source 60 and at least one splitter 62 to divide the primary wave source 60, thereby ensuring that the wave sources 50 have constant phase relationships. The spatial profile of any of the sources or of the primary wave source may also be modified by one or more spatial modulators 61, discussed later. The focusing system 55 is arranged so that the wave sources 50 are coherently combined in the central high amplitude region 30. An effective numerical aperture of the focusing system 55 is related to the angle 57 subtended by all of the sources 50 intersecting in the high amplitude region 30.

Each wave source 50 need not necessarily be itself focused by the focusing system. In some cases, however, some focusing of individual sources may be advantageous, for example, for purposes of collimation. Additionally, the number of wave sources 50 utilized in any one of several possible realizations of the invention affects the ratio between the peak intensity of the focused high amplitude spot 30 to the background intensity. For the purposes of this invention, this ratio is referred to as "contrast".

Figure 5:
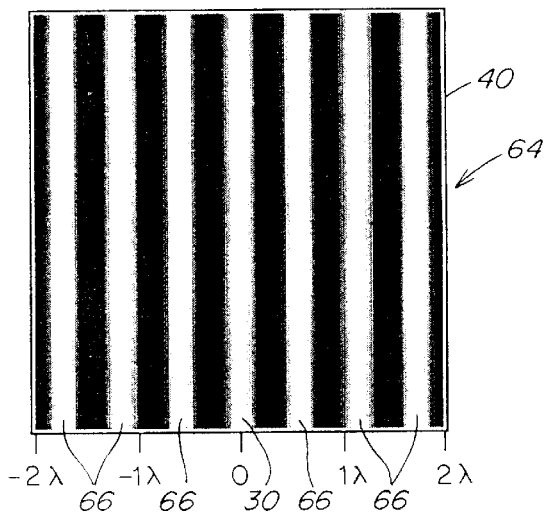
FIG. 5 is an image of an interference pattern of two monochromatic waves according to FIG. 2, with an angle of incidence of 60°.

As discussed previously in connection with FIG. 1, a pattern of interference spots is typically generated by the coherent combination of single wavelength (monochromatic) or narrow bandwidth (nearly monochromatic) wave sources. FIG. 5 shows an interference pattern 64 of two monochromatic coherently combined plane waves according to FIG. 2, with an angle of incidence 46 of 60°. The interference pattern 64 is viewed looking down onto the focal plane 40 of FIG. 2. Referring again to FIG. 5, the monochromatic or narrow bandwidth wave sources produce a narrow central maximum or high amplitude spot 30 at the point of intersection, but also generate secondary high amplitude regions or "sidelobes" 66 distributed throughout the focal plane with an intensity comparable to the central maximum spot 30.

Figure 6:
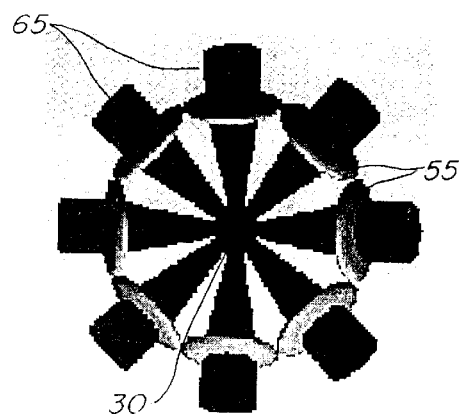
FIG. 6 is a diagram showing an arrangement of eight monochromatic sources focused to a same central high amplitude region.
Figure 7:
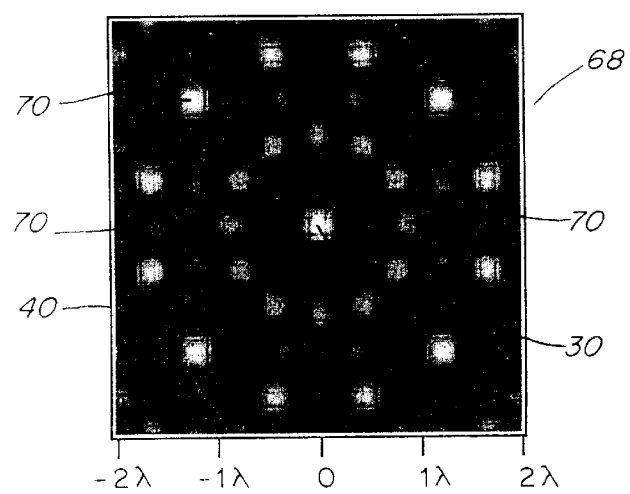
FIG. 7 is an image of an interference pattern of the sources of FIG. 6 in a focal plane of the central high amplitude region, showing several secondary high amplitude regions.

As an additional illustration of sidelobe generation due to the coherent combination of narrow bandwidth wave sources, FIG. 6 shows an arrangement of eight discrete narrow bandwidth wave sources 65 which are focused by a focusing system 55 and coherently combined in a high amplitude region 30. The use of greater numbers of sources would be desirable, for example, in an application requiring increased contrast between the intensity of the high amplitude region and the background. FIG. 7 shows the resulting interference pattern 68 of the arrangement of FIG. 6, when the wave sources 65 are equally spaced around a circle and intersect the focal plane of the high amplitude region 30 at an angle of 60° with respect to a normal to the focal plane. From FIG. 7, a central high amplitude spot 30 is seen to be surrounded by concentric ring patterns 70 of spots representing interference sidelobes.

To reduce such patterns of interference sidelobes so that a single high amplitude spot is obtained, the wave sources 50 of the invention shown in FIG. 4 have a sufficient bandwidth such that, for each source, the focusing system spatially redistributes the bandwidth along at least one of a first direction parallel to a propagation direction of the source and a second direction transverse to the propagation direction. The focusing system may accomplish such a spatial redistribution of bandwidth by employing, for example, an optional arrangement of dispersive elements 63 which appropriately disperse the wave packets of each source into their constituent wavelength (or frequency) components in a manner essentially transverse to the propagation direction. Alternatively, the path lengths and/or the angles of incidence of the sources to the focal plane may be tailored within the focusing system such that, while maintaining essentially coherent combination of the sources in the central high amplitude region, the spatial redistribution of the bandwidth optimally suppresses the sidelobes. These alternatives will be discussed in more detail below.

Yet another alternative to achieve sidelobe suppression according to the invention is accomplished by employing wave sources having a sufficient bandwidth. For purposes of this invention, a "sufficient bandwidth source" refers to any source that is not essentially monochromatic. Examples of sources having a sufficient bandwidth appropriate for the invention are discussed further below. In practice, it is quite difficult to realize truly monochromatic sources, so even those sources referred to in the art as monochromatic typically have some finite bandwidth, however narrow. An example of an essentially monochromatic source is a continuous wave laser. Sources more appropriate for one possible realization of the invention, however, are high bandwidth sources. For electromagnetic waves, a classic example of a high bandwidth source is a white-light source, such as a lamp. While continuous-wave white-light lasers are not yet known, such a source, for purposes of illustration, would be appropriate for the invention. As a general example, the term high bandwidth may also be used to refer to essentially monochromatic or narrow bandwidth wave sources that have been modulated by various known methods, some of which are discussed below.

Sources that are not essentially monochromatic can be viewed as outputting wave packets resulting from the superposition of waves having different frequencies, where the frequency of a wave is inversely proportional to wavelength. The superimposed waves create an envelope or "packet" having a center frequency ω and containing a number of other frequencies surrounding the center frequency. The range of frequencies contained within the wave packet is referred to as the bandwidth Δω. The wave packet propagates with a group velocity that may be greater than, equal to, or less than the velocity of the center frequency.

Figure 8D:
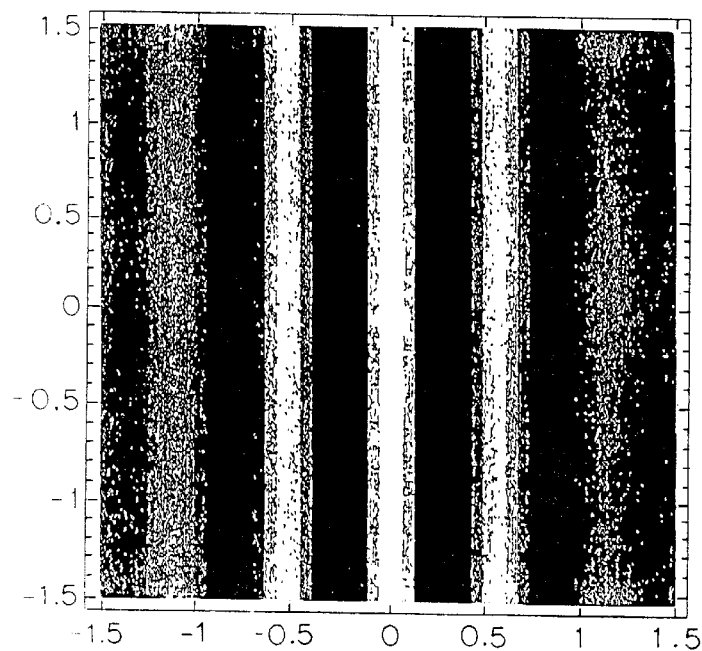
Figure 8E:
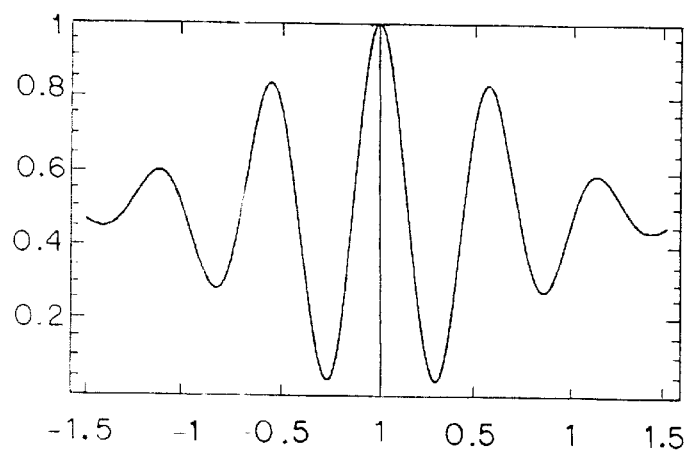
Figure 8F:
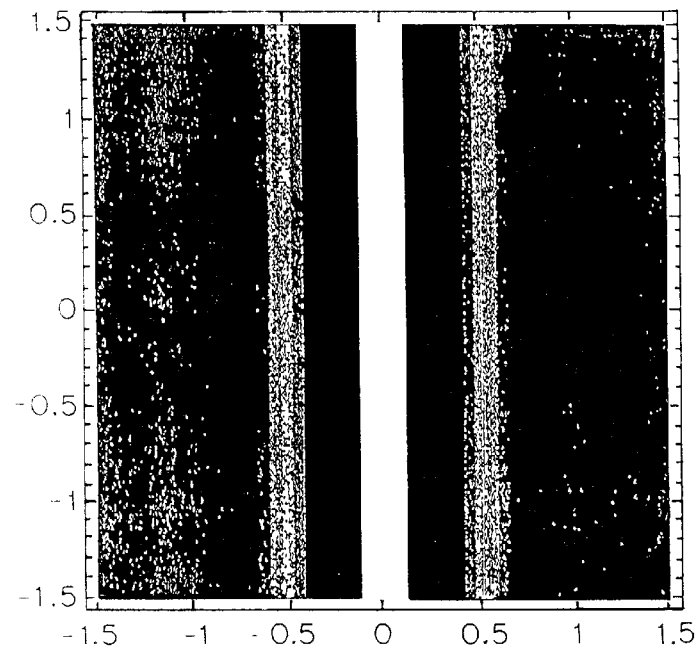
Figure 8G:
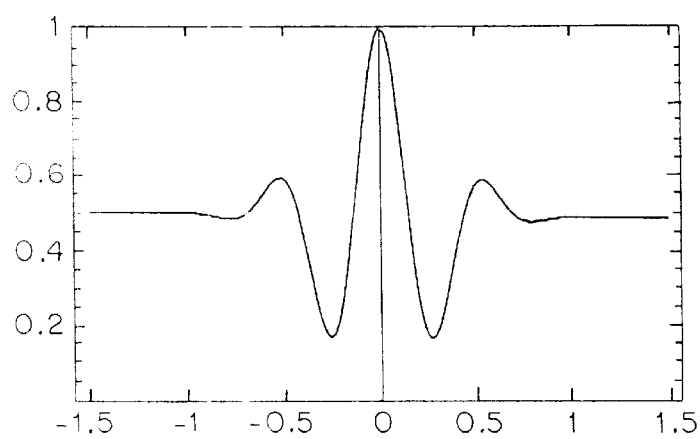

FIGS. 8A–C demonstrate the effect of wave packet bandwidth Δω on interference sidelobe generation for the two-wave source configuration according to FIG. 2 and FIG. 8D demonstrates this effect for the configuration according to FIG. 6. If the ratio of wave packet bandwidth Δω to center frequency ω is on the order of 0.04, representing a modestly high bandwidth wave source, the graph 72 of FIG. 8A illustrates that, while a central maximum is clearly identified, several sidelobes are also observed. As the bandwidth Δω of the wave packet is increased, for example, as shown in graph 74 of FIG. 8B by a ratio Δω/ω of 0.15 and in graph 76 of FIG. 8C by a ratio Δω/ω of 0.25, the number of sidelobes generated by constructive interference is dramatically reduced. By employing wave sources outputting wave packets having a high bandwidth, preferably on the order of 0.05 times the center frequency or greater, more preferably on the order of 0.1 times the center frequency or greater, and even more preferably on the order of 0.15 times the center frequency or greater, the method and apparatus of the invention effectively reduces interference sidelobes while maintaining a high amplitude spot having a dimension that approaches the fundamental limit of 0.25λ.

While FIGS. 8A–C illustrate the affect of source bandwidth on sidelobe generation for two wave sources, increasing the number of wave sources employed by the invention results in less stringent bandwidth requirements. Furthermore, as discussed earlier, other alternatives according to the invention, such as including dispersive elements in the focusing system, varying path lengths and tailoring incident angles of sources, can be used in combination with any number of sources to achieve sidelobe suppression. FIGS. 8D–G show the effect of tailoring angles of incidence for the individual sources while holding Δω/ω constant. FIGS. 8D and E show plots for equal incident angles, while in FIGS. 8F–G, each incident angle is slightly different. Combining these exemplary techniques will further reduce the bandwidth requirements for the sources.

As seen in FIGS. 8D–G sidelobe suppression is markedly improved. The basic principal of the method and apparatus of the invention is that the sources have a sufficient bandwidth to be spatially redistributed by the focusing system so as to substantially reduce interference sidelobes.

An example of one technique useful for achieving wave packets having a high bandwidth is to generate short pulses of a single wavelength or narrow bandwidth wave source. Each pulse represents a wave packet containing a number of frequencies. A fundamental relationship of Fourier mathematics states that the frequency content of a pulse is related to the duration of the pulse according to the approximation:

$$\tau \Delta \omega \approx 1, \quad (4)$$

where Δω is the frequency bandwidth of the pulse and τ is the pulse width in time. From Eq. (4), it can be seen that a wave packet having a narrow bandwidth Δω will extend over a large region of time and space. In contrast, very short pulses having a small τ will have a corresponding high bandwidth Δω.

Wave packets may also be described in terms of a "coherence length." Coherence length refers to the distance over which a wave may constructively interfere with one or more other waves having an appropriate phase relationship. A wave packet having a pulse width τ propagating at a velocity v has a coherence length $L_c$ given by:

$$L_c = \tau v. \quad (5)$$

From Eq. (5), it can be seen that a short coherence length corresponds to a short pulse width and hence a high bandwidth.

As an illustration of the various parameters used to describe wave packets, an example using optical waves is considered. Optical waves in the visible light region have a wavelength of approximately 400 to 700 nanometers, corresponding to a range of radian frequencies ω of approximately $10^{15}$ radians per second. Referring again to the discussion in connection with FIGS. 8A–C, a source of wave packets in the visible region having a bandwidth sufficient to suppress interference sidelobes according to the method and apparatus of the invention would require a Δω on the order of $10^{14}$ radians per second (Δω/ω>0.1). From Eq. (4), this bandwidth corresponds to a pulse width τ on the order of femtoseconds ($10^{-15}$ sec). From Eq. (5), using a velocity v on the order of the speed of light, a pulse width on the order of femtoseconds corresponds roughly to a coherence length $L_c$ on the order of a few wavelengths in the visible region.

For any wavelength region, similar calculations will reveal an appropriate pulse width for a wave packet so that sufficient sidelobe suppression is achieved by the method and apparatus of the invention. Any number of temporal modulation and/or pulse generation techniques can be implemented with a number of wave sources, or a primary wave source split into two or more sources, to realize a sufficient source bandwidth. For example, known methods for creating high bandwidths and/or short pulses for sound waves and radio waves, particularly for sonar, ultrasound, and radar applications, include combining a phase-locked array of modulated sources. The sources may additionally have different frequencies and appropriate specific amplitude relationships.

Figure 9:
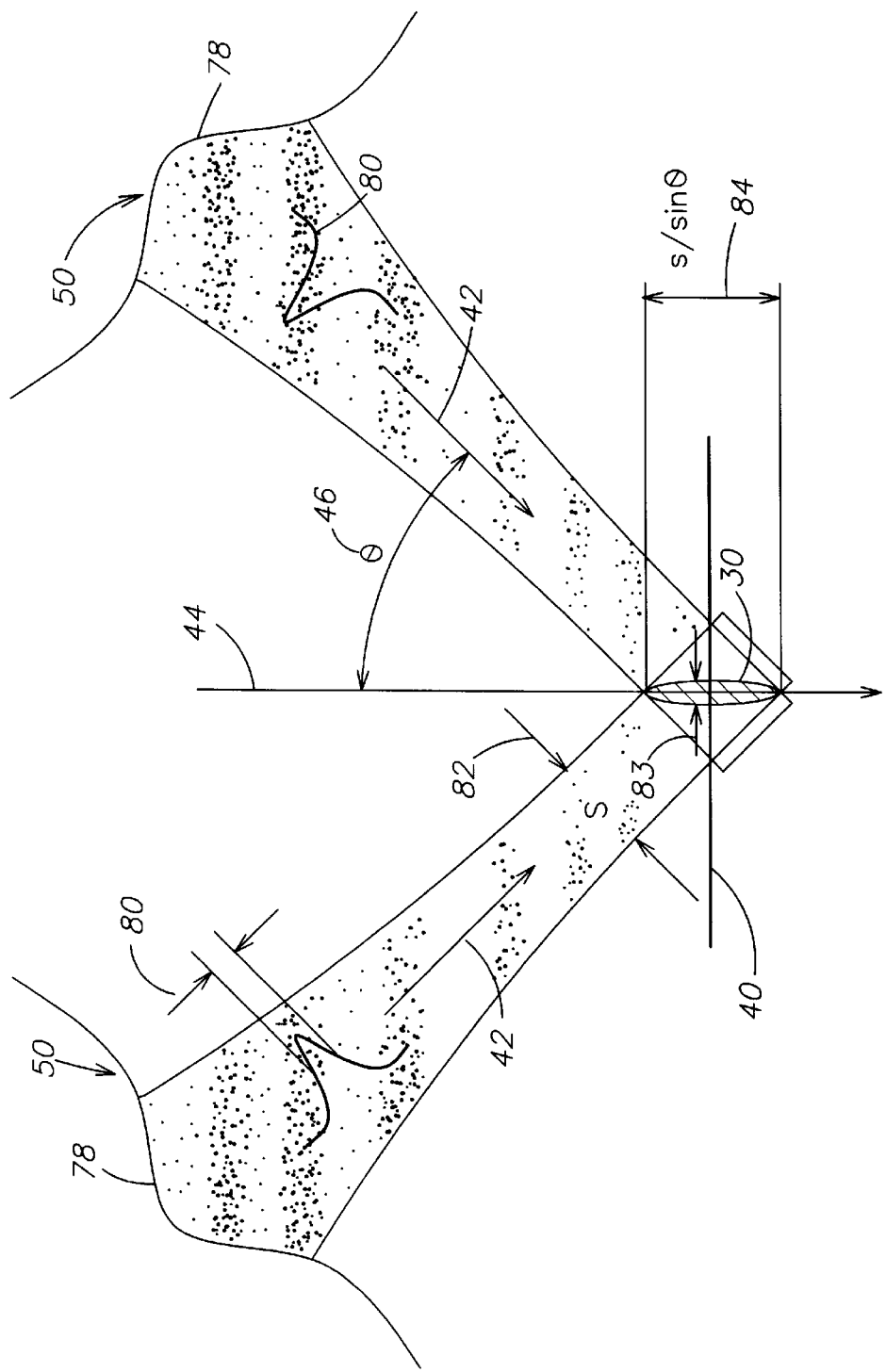
FIG. 9 is a diagram showing the coherent combination of source waves according to the invention and the resultant central high amplitude region.

Returning to the discussion of high bandwidth wave sources for the optical region, sub- and more particularly femtosecond laser pulses having a coherence length of only a few wavelengths are known in the art. Furthermore, known methods of continuum generation, some of which employ optical fibers and/or nonlinear optical processing techniques, can be utilized in conjunction with laser pulses having a duration of up to approximately ten picoseconds to produce "chirped" pulses having a significantly broadened frequency spectrum and hence high bandwidth Δω. Chirped pulses are those in which the different frequency components of the wave packet occur in different parts of the packet. For a positively chirped pulse, high frequencies occur in a leading portion of the wave packet whereas low frequencies occur in a trailing portion of the wave packet. The reverse is true for a negatively chirped pulse. Linearly chirped laser pulses having a duration of up to approximately ten picoseconds may therefore be effectively used in the method and apparatus of the invention as sources of wave packets having a high bandwidth, achieving bandwidth-to-center frequency ratios Δω/ω significantly greater than 0.1, and hence more than sufficient interference sidelobe suppression in the optical wave region.

laser beam wave sources typically have Gaussian spatial profiles. FIG. 9, based on the illustration of FIG. 2, shows one possible embodiment of the invention using spatially and temporally Gaussian wave sources. At least two generic wave sources 50, each having a Gaussian spatial profile 78 and wave packets in the form of short pulses 80, are arranged such that each source is focused to a same high amplitude region 30. The pulses propagate in a direction indicated by the wavevectors 42 toward a focal plane 40, wherein a normal to the focal plane 40 is represented by a vector sum 44 of the wavevectors 42. Each of the pulses 80 intersect the focal plane 40 at an angle 46 (θ) with respect to the normal 44. The sources 50 are arranged such that the pulses 80 coherently combine in the high amplitude region 30. That is, the pulses 80 arrive to the high amplitude region 30 essentially at the same time so as to constructively interfere.

FIG. 9 additionally shows that the resulting high amplitude region 30 is elongated and pencil-shaped in a direction normal to the focal plane 40. Each of the individual wave sources 50 has a minimum dimension 82 normal to the respective wavevector 42, which is a diffraction limited spot size. The dimension or spot size 83 of the pencil-shaped high amplitude region 30 in the focal plane 40, however, is significantly less than the diffraction limited spot size 82 of each of the individual sources 50.

The dimension 84 of the pencil-shaped high amplitude region 30 shown in FIG. 9, in the direction normal to the focal plane 40, is referred to as the depth of focus (DOF). A small depth of focus implies that the spot size 83 is small only within a short distance from the focal plane 40. Conversely, a large depth of focus implies that the spot size 83 is small over a relatively large distance from the focal plane 40. As seen in FIG. 9, the embodiment of the invention described above is characterized by a large depth of focus.

In general, the depth of focus is proportional to the wavelength λ, and with conventional lenses it is inversely proportional to the square of the numerical aperture of the lens. However, in the embodiment of the invention described above, the depth of focus is related to the spot size 82 of each of the individual wave sources 50, and for sources with a Gaussian spatial profile 78 is given approximately by:

$$DOF = \left[\frac{\sin\theta}{S} + \frac{\lambda}{S^2}\right]^{-1} \approx \frac{S}{\sin\theta}, \quad (6)$$

where S is the spot size 82 and θ is the angle 46. The second approximation is valid when sin θ>>λ/S.

Figure 10:
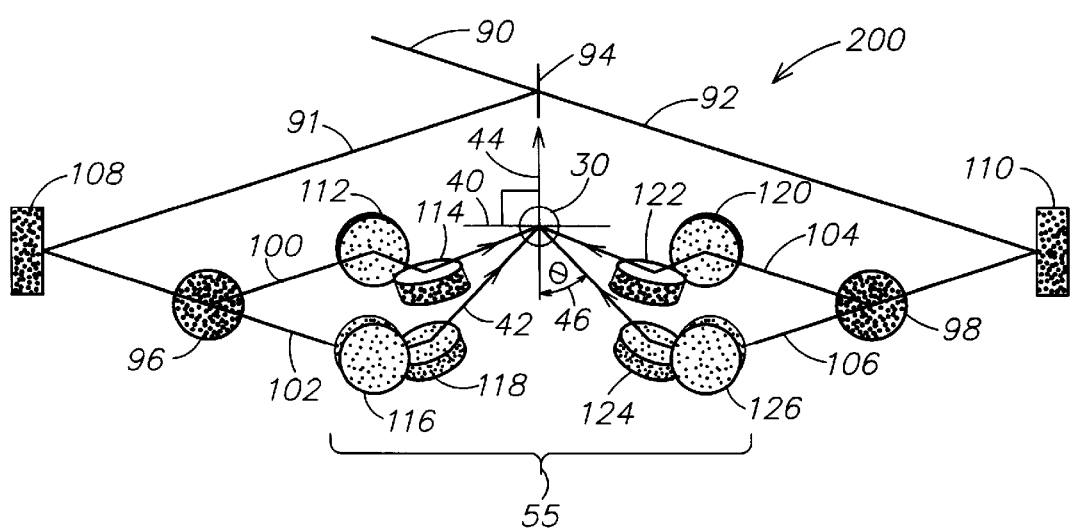
FIG. 10 is a schematic diagram showing a first embodiment of the apparatus according to the invention.

FIG. 10 shows a configuration of elements 200 representative of a preferred embodiment of the method and apparatus of the invention. In FIG. 10, the wave sources 50 shown in FIG. 4 are individually referenced for further clarification. A first wave source 90 is divided by a first splitter 94 into two wave sources 91 and 92 having constant phase relationships. Each of the sources 91 and 92 is in turn divided in two again by two second splitters 96 and 98 to produce four wave sources 100, 102, 104 and 106 having constant phase relationships. Two reflectors 108 and 110 direct the sources 91 and 92 to the second splitters 96 and 98. A focusing system 55 comprising components 112, 114, 116, 118, 120, 122, 124 and 126 directs the four sources 100, 102, 104 and 106 to high amplitude region 30 such that the wave packets of each source are coherently combined in the high amplitude region. Examples of suitable components for the focusing system include, but are not limited to, lenses, curved reflectors, mirrors, prisms, or combinations of the above.

The splitters 94, 96 and 98, the reflectors 108 and 110, and the focusing system 55 are arranged such that upon approaching the high amplitude region 30, the four sources 100, 102, 104 and 106 are equally spaced around a circle essentially defined by the points of intersection of the sources on the components 114, 118, 122 and 124. In this manner, the wave packets of each source travel identical path lengths to reach the high amplitude region 30. Additionally, the circular arrangement of the sources approaching the high amplitude region 30 results in an apparently large subtended angle for the sources and hence an effectively increased numerical aperture for the focusing system 55. As a result, the numerical aperture of each of the individual components of the focusing system 55 can be conveniently small. The high amplitude region 30 is located out the plane of the circle in a focal plane 40, and each of the sources approaches the focal plane 40 such that their respective wavevectors 42 make an angle 46 with respect to a normal 44 to the focal plane 40. The normal 44 is defined by a vector sum of the wave vectors 42.

The preferred embodiment of the invention is an eight-source version of the apparatus shown in FIG. 10, having two such four-source apparatus 200 that are rotated by 45° with respect to each other. The first wave source 90 of each apparatus 200 is then preferentially provided by the same primary wave source 60 shown in FIG. 4, such that the plurality of splitters used for both of the apparatus 200 constitutes splitter 62 of FIG. 4 and the resulting eight beams intersecting the focal plane 40 constitute the wave sources 50 of FIG. 4.

Furthermore, with reference to both FIGS. 4 and 10, in the preferred embodiment of the invention, the primary wave source 60 is a laser beam source having a duration of up to approximately ten picoseconds outputting high bandwidth wave packets comprising linearly chirped pulses. The primary source 60 is divided by splitter 62 into eight identical spatially and temporally Gaussian optical beams 50 equally spaced around a circle and each propagating toward the focal plane 40 at an angle 46 of θ=60°. Some examples of splitters useful for any primary sources in the optical region include, but are not limited to, gratings, plate beamsplitters, cube beamsplitters, spatial light modulators, and the like.

The fluence distribution (energy per unit area) in the focal plane 40 from such an arrangement of N wave sources is given by:

$$F(r) = \sum_{i,j=1}^{N} P_{ij} u_i(r) u_j^*(r) e^{[-ik_o r(\hat{n}_i - \hat{n}_j)]} e^{-2[r(\hat{n}_i - \hat{n}_j)]^2/(c\tau_o)^2}. \quad (7)$$

where $k_o = 2\pi/\lambda$, λ is the wavelength of the sources associated with the center frequency of the wave packets, r is a vector in the focal plane 40, $n_i$ is a unit vector corresponding to the wavevector 42 of beam i, and $u_i(r)$ represents the Gaussian complex spatial field profile 78 (see FIG. 9) of laser beam i. The factor $P_{ij}$, which is a function of the electric field polarizations of optical beams i and j, is calculated from the Poynting vector for the composite field.

Figure 11:
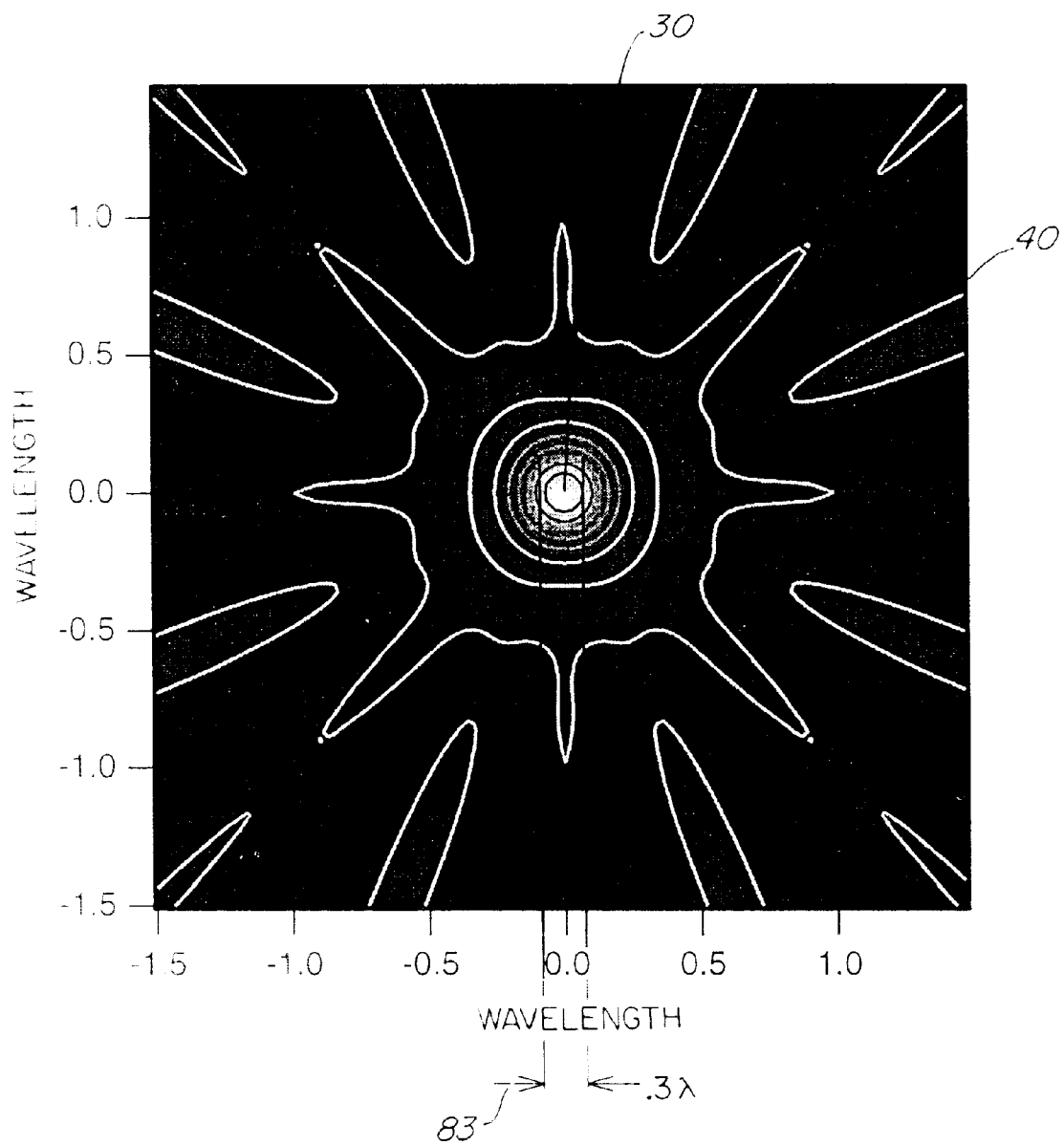
FIG. 11 is a computer image showing the results of a computer simulation of the high amplitude region fluence distribution, revealing the spot size of the central high amplitude region resulting from the apparatus of FIG. 10.

FIG. 11 shows a view looking onto the focal plane 40 from the direction of the incident sources, similar to that of FIGS. 5 and 7. FIG. 11 illustrates the results of Eq. (7) for eight laser pulse source beams having a duration of up to approximately ten picoseconds (N=8), each spectrally broadened to have a coherence length of approximately two times the wavelength (2λ), or a bandwidth-to-center frequency ratio Δω/ω of approximately 0.13. In FIG. 11, the polarizations of the individual beams were selected to be those which maximized the electric field component of the composite field parallel to the focal plane 40 in the high amplitude region 30. As can be seen from FIG. 11, the interference sidelobes are effectively suppressed by the high bandwidth sources, and the dimension 83 of the spot 30 in the focal plane 40 is on the order of 0.3 times the wavelength (0.3λ). This result is appreciably closer to the fundamental spot size limit of 0.25λ than the results obtained using immersion optics techniques, which can focus a beam to a minimum spot size of approximately 0.4λ.

As discussed earlier, an additional suppression of interference sidelobes may be achieved in the method and apparatus of the invention by deliberately introducing an asymmetry amongst the wavevectors 42 of the wave packets incident to the high amplitude region 30. Referring again to FIG. 9, a pseudo-random orientation deviation from symmetry of the wave sources, such that the pulses 80 are very slightly spatially shifted with respect to each other, lowers the bandwidth requirement of the wave packets necessary to confine the intense constructive interference to the high amplitude region 30 and its immediate subwavelength vicinity. Such a pseudo-random orientation deviation is preferably implemented by small changes to the incidence angle 46 for each wave packet source, such that the angle 46 is not equal for all of the sources. This deviation has the effect of spatially redistributing the frequency components within the bandwidth of each source, thereby achieving sidelobe suppression.

Figure 12:
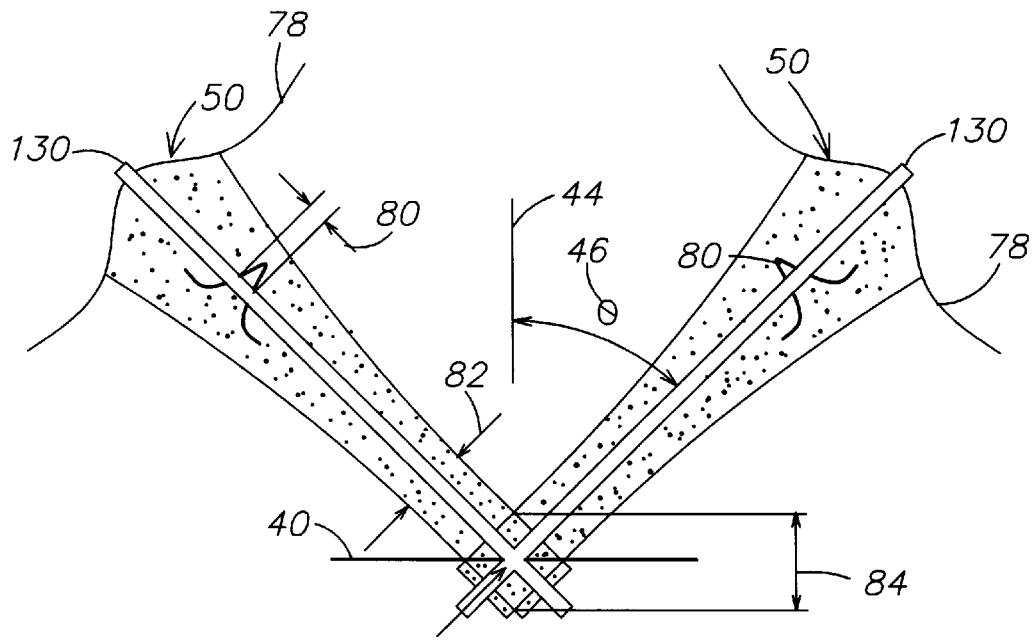
FIG. 12 is a diagram showing a spatial pattern of a primary source of the apparatus according to the invention.

A particular feature of the method and apparatus of the invention is that a spatial inhomogeneity of any one of the wave sources or of the primary wave source, resulting in a transverse pattern in the source beams 50, can be used to produce a corresponding spatial intensity profile in the focused wave high amplitude region 30. FIG. 12 shows the two spatially and temporally Gaussian source waves 50 of FIG. 9, wherein each of the sources has a hole 130 at the center of its spatial profile 78. This hole 130 is transferred to the high amplitude interference region 30 producing a spatial hole 132 in the center of the high amplitude region 30, as shown in FIG. 13.

Figure 13:
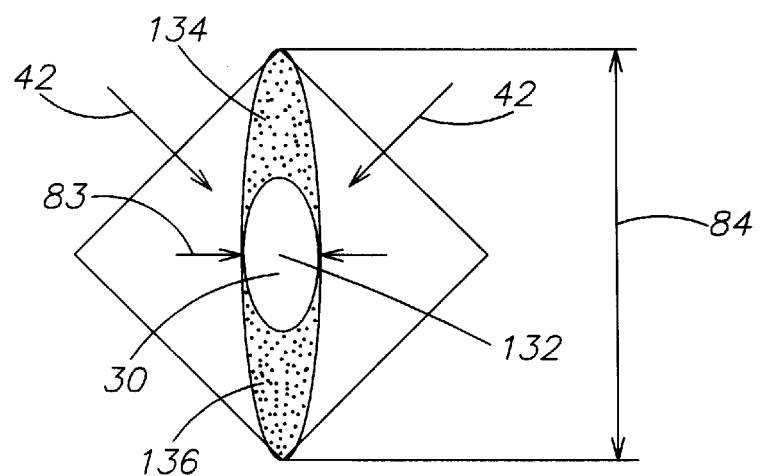
FIG. 13 is a diagram showing a pattern in the central high amplitude region resulting from the primary source spatial pattern illustrated in FIG. 12.

Referring to FIG. 13, any desired pattern along the length 84 of the high amplitude region 30, limited only by diffraction, can be produced by tailoring the transverse spatial profile 78 of the source waves 50, either individually or as a collective. The length 84 of the pattern is approximately the depth of focus (DOF) given by Eq. (6). FIG. 13 shows an example pattern of two discrete high amplitude subregions 134 and 136 separated by the hole 132 within the high amplitude region 30. Another example of a possible pattern would include a plurality of discrete high amplitude subregions arranged essentially longitudinally within the high amplitude region, wherein the subregions are separated from each other by a spatial hole.

Referring again to FIG. 4, the apparatus according to the invention can also include one or more spatial modulators 61 to modulate the spatial pattern of the source profile 78 of any of the sources so that a complex pattern of high amplitude subregions, similar to 134 and 136, or a single high amplitude subregion, may be positioned throughout the high amplitude region 30. In this manner, the length 84 of the high amplitude region 30 may be "scanned" by one or more discrete high amplitude subregions.

Figure 14:
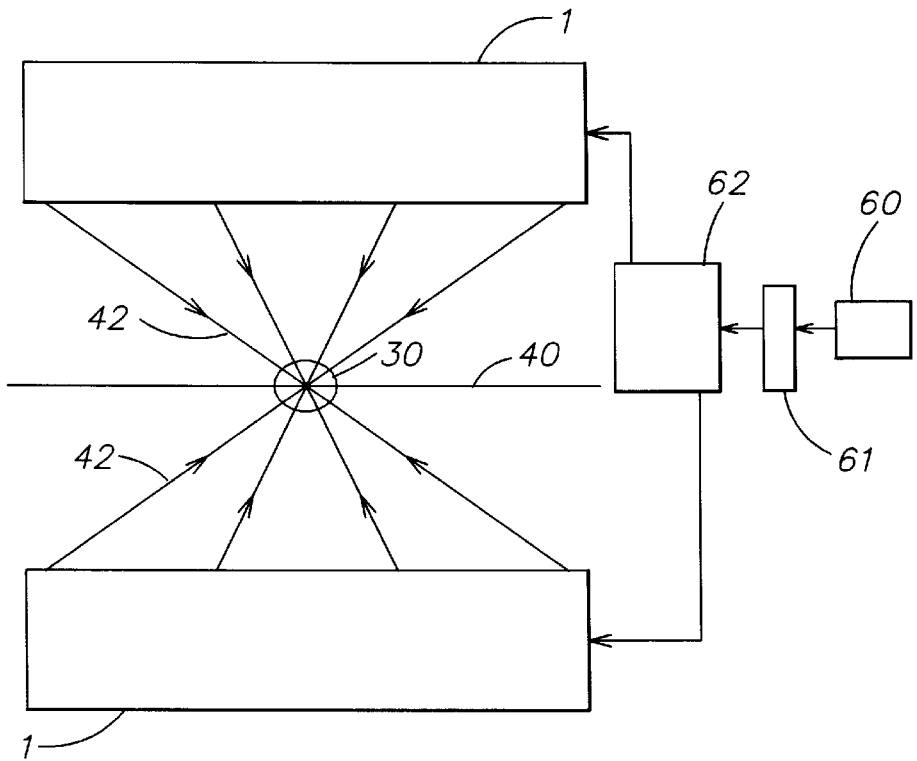
FIG. 14 is a schematic diagram of a second embodiment of the apparatus according to the invention.

FIG. 14 shows a second embodiment of the method and apparatus according to the invention, in which a low depth of focus is achieved for the high amplitude region 30. This embodiment of the invention essentially comprises at least two wave focusing apparatus 1, for example, as described in the preferred embodiment of the invention. FIG. 14 shows a particular example arrangement of two "head-to-head" wave focusing apparatus 1. A first apparatus directs wave sources to the high amplitude region 30 from one side of the focal plane 40, and a second apparatus directs wave sources to the high amplitude region 30 from an opposite side of the focal plane 40. Each of the wave sources of both apparatus, represented in FIG. 14 by their respective wavevectors 42, have constant phase relationships and are coherently combined in the high amplitude region 30. The apparatus of the second embodiment may also include a primary wave source, from which the wave sources for each apparatus 1 are derived by means of at least one splitter 62 which divides the primary wave source 60.

Referring again to FIG. 9 for comparison, the high amplitude region 30 resulting from the particular head-to-head example of the apparatus of the second embodiment shown in FIG. 14 is an approximately spherical shaped volume, having dimensions 83 and 84 which are approximately equal, unlike that shown in FIG. 9. The apparatus of FIG. 14, therefore, is a low depth of focus system. Such a system is preferable, for example, in microscopy applications for which depth resolution is critical. Based on the fluence distribution shown in FIG. 11 for the apparatus of FIG. 10, a spherical high intensity volume having a radius on the order of 0.3λ can be obtained using the apparatus of the second embodiment.

The wave focusing method and apparatus described thus far may be used in a host of applications requiring a high energy density within a small physical dimension. In addition to modulating the spatial profile of source waves illuminating a high amplitude region, as described above in connection with FIGS. 12 and 13, the wave packets of the wave sources may be temporally tailored to excite and/or detect specific properties of a material exposed to the high amplitude region. For example, consecutive wave packets output from the wave sources may each have different frequency chirps or may be differently delayed with respect to one another. A suitable method would then be employed to detect radiation emitted by or reflected from the material, or changes in structure of the material upon exposure to the high amplitude region, wherein the radiation or structure changes bear a particular signature or distinctive feature associated with the differently chirped and/or delayed pulses.

Figure 15:
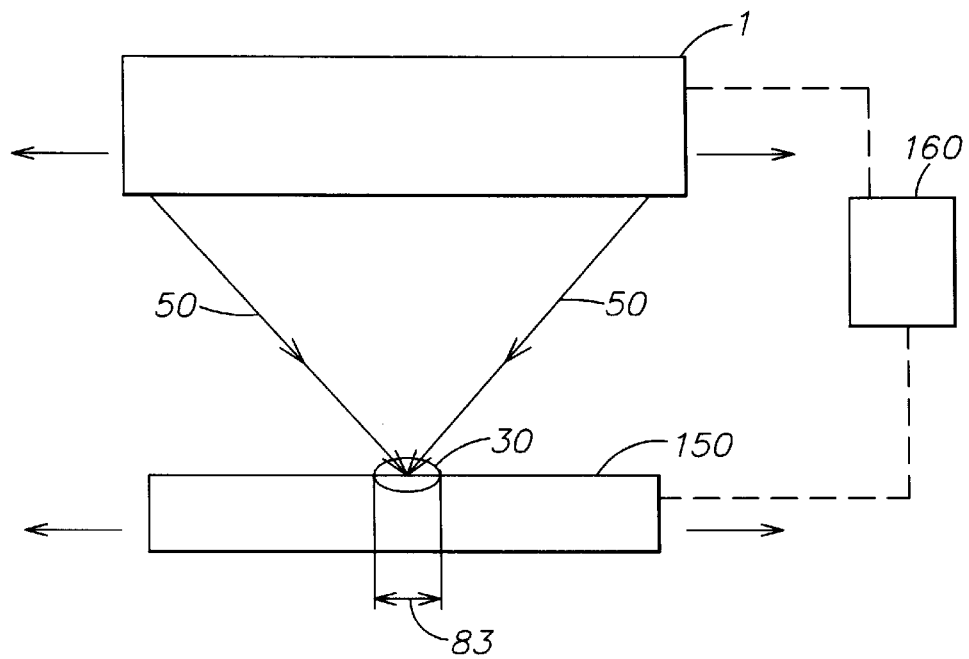
FIG. 15 is a schematic diagram of a material patterning system according to a third embodiment of the invention.

FIG. 15 shows a third embodiment of the present invention directed to a material patterning system which includes the wave focusing apparatus described above. For purposes of this invention, material patterning refers to any process which materially alters a sample in the vicinity of a high amplitude wave region. Examples of material patterning include, but are not limited to, changes in material phase, molecular structure, chemical composition, rheological properties, shape, index of refraction, optical transmission and reflection, and absorption, as well as the processes of ablation, cutting, sawing, dicing, welding, melting, cauterizing, deforming, and printing, such as laser printing.

Referring to FIG. 15, the material patterning system of the invention comprises at least one wave focusing apparatus 1, wherein each apparatus 1 directs wave sources 50 to a high amplitude region 30 of a sample 150. The material patterning system also includes a translator 160 to move the high amplitude region 30 throughout for example all of a selected region of the sample 150 in a desired pattern, so that portions of the sample 150 exposed to the desired pattern are altered in, for example, one of the ways indicated above. The translator 160 may operate, for example, to move either the wave focusing apparatus 1, the sample 150, or both in a coordinated fashion. In some applications, translator 160 may merely establish a position for a single region 30 to be operated on. The exposed portions of the sample 150 will have a minimum feature size corresponding to the dimension 83 of the high amplitude region 30 in the plane of the sample 150.

The material patterning system may further include a primary wave source and at least one splitter to divide the primary wave source into at least two wave sources for each focusing apparatus 1 employed in the material patterning system. Any one of the wave sources or the primary wave source of the material patterning system may additionally have a spatial pattern which produces a corresponding pattern in the high amplitude region 30 of the sample 150. The corresponding pattern may be a plurality of discrete high amplitude subregions within the high amplitude region 30. The material patterning system may further include one or more spatial modulators to modulate the spatial pattern of any of the sources or the primary wave source so that at least one high amplitude subregion may be positioned throughout the high amplitude region 30 of the sample 150. Furthermore, the material patterning system may employ two or more focusing apparatus, for example, the two head-to-head focusing apparatus such as shown in FIG. 14, to produce a volumetric high amplitude region 30 in the shape of a sphere.

The use of a high intensity primary wave source for the wave focusing apparatus of the material patterning system of FIG. 15 provides a material patterning system that can be based on nonlinear processes occurring in the sample 150 within the high amplitude region 30. However, any application which makes use of material changes in a sample can benefit from the material patterning system of the invention employing one or more ultra-high resolution wave focusing apparatus. Such applications include, for example, but are not limited to, surgical or dermatological procedures including incisions, ablations, cauterizations and the like, precision control of chemical processes, precision welding, or data storage, including "writing" in an optically active media whose optical activity can be turned on or off by optical irradiation, and magnetic writing, which exploits various polarization states of a medium that can be modified by short intense pulses.

Particularly with respect to data storage applications, the region of the sample 150 in which a data bit pattern is written using the material patterning system of the invention can be highly localized in the sample plane while simultaneously penetrating deep into the sample. This type of data writing corresponds to a wave focusing apparatus producing a large depth of focus. Alternatively, the written pattern can be localized in both the transverse and longitudinal directions of the sample, corresponding to a small depth of focus as produced, for example, by the apparatus illustrated in FIG. 14. Each of these alternatives has advantages depending on the geometry of the sample medium. For example, writing a data bit pattern immediately below the surface of the sample medium that is irregular on a scale larger than the desired subwavelength resolution would be most effectively accomplished using a small depth of focus. Alternatively, in writing a pattern corresponding to data bit storage in multiple layers beneath a sample surface, such that the storage is volumetric in nature rather than on the surface, an optimum storage strategy would be to increase the depth of focus so as to maximize the volumetric storage density of a bit pattern, as discussed in connection with FIGS. 12 and 13.

In addition to data storage applications, the material patterning system of the invention can be utilized in several lithographic applications. Such a system can be used to irradiate a wafer containing a resist responsive to particular wavelengths such that the intensity of the high amplitude region and its vicinity is above a threshold for inducing chemical reactions that modify the resist. The induced reactions may be either linear or nonlinear functions of the intensity in the high amplitude region. Direct chemical etching in the presence of a background gas can also be accomplished with the material patterning system of the invention, wherein the etching occurs only in the high amplitude region and its immediate vicinity, where the wave intensity is above a threshold for the formation of gaseous products that are efficient enchants.

Another appropriate application for the material patterning system of the invention includes the fabrication of microelectronic machine structures (MEMS). Many microelectronic machine structures are fabricated from silicon substrates. Using the material patterning system of the invention to alter the structure of any suitable substrate, one can produce microelectronic machine structures with high precision in three dimensions. The depth of focus of the material patterning system can also be adjusted, as described above in connection with data storage applications, so as to produce a series of structures that are either long and thin or small in all three dimensions. Such a series of structures can be either interconnected or unconnected with one another.

Figure 16:
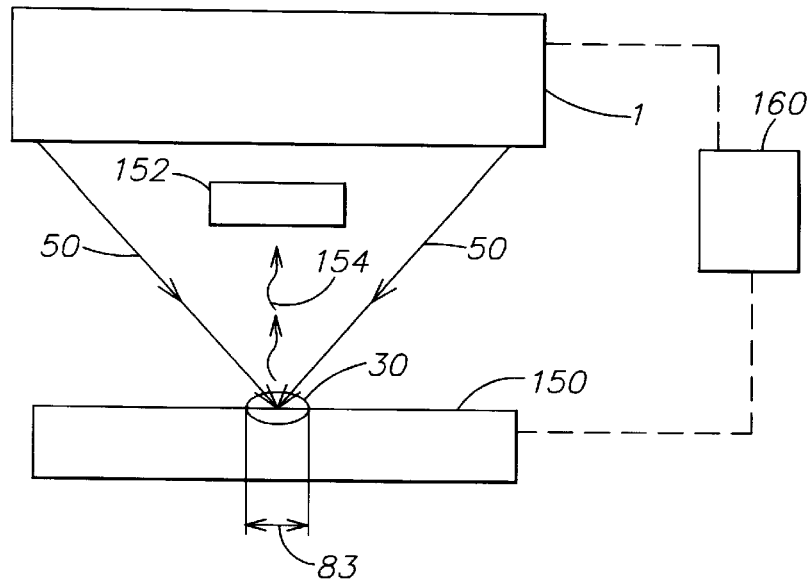
FIG. 16 is a schematic diagram of an imaging system according to a fourth embodiment of the invention illustrating a first example of detector position.
Figure 17:
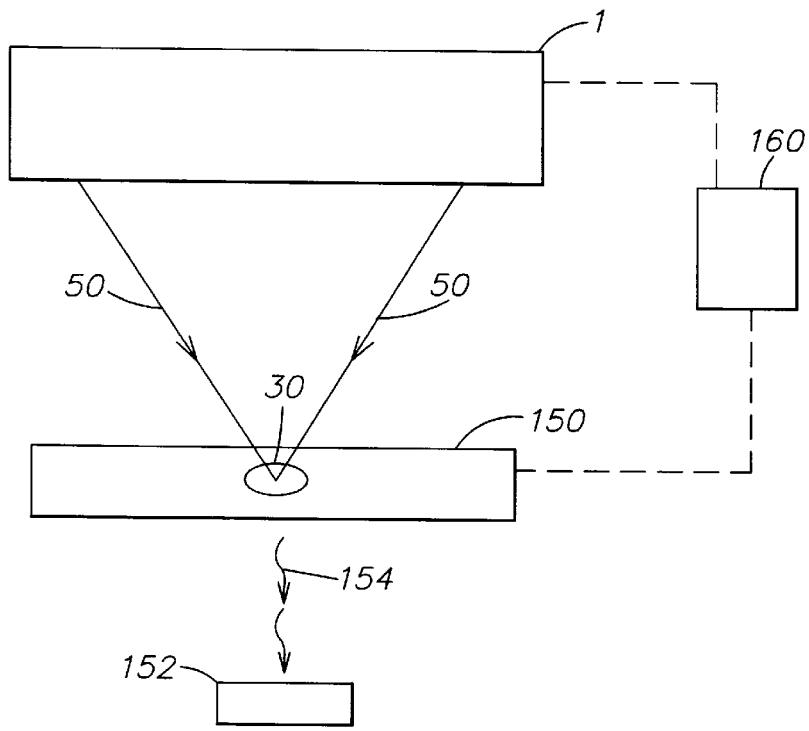
FIG. 17 is a schematic diagram of the imaging system according to a fourth embodiment of the invention, illustrating a second example of detector position.
Figure 18:
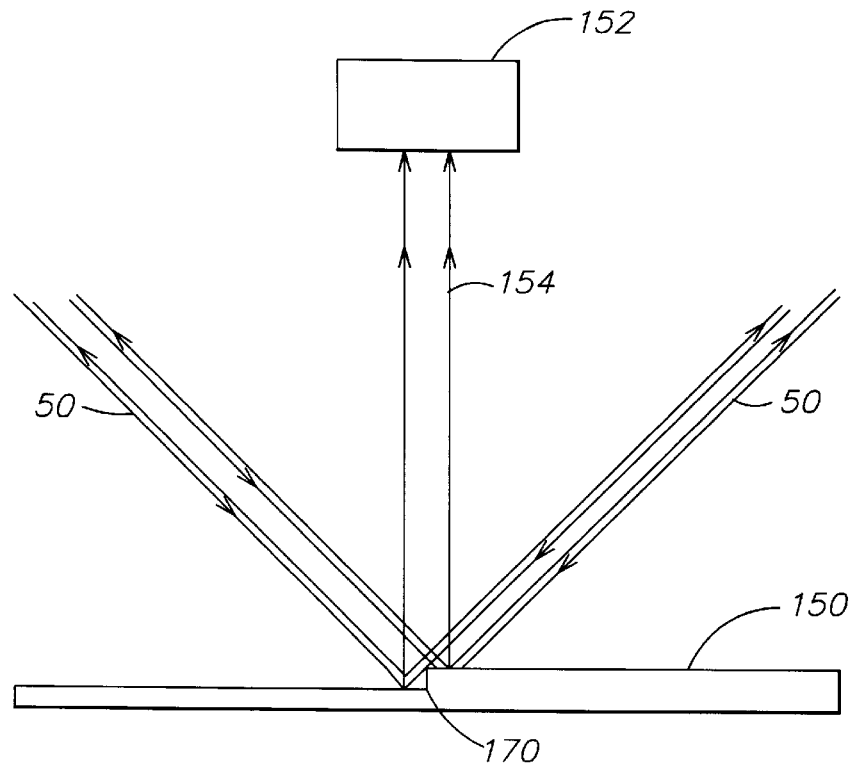
FIG. 18 is a diagram showing an example of the imaging system of the invention, used to detect a surface profile of a sample.

FIGS. 16, 17 and 18 show a fourth embodiment of the present invention directed to an imaging system which includes the wave focusing apparatus described herein. Examples of imaging for the purposes of this invention include, but are not limited to, sonar, ultrasound imaging, radar, microscopy, including scanning laser microscopy, surface imaging, including ellipsometry based on the polarization of harmonic radiation emitted from an exposed sample, acousto-optic modulation scanning techniques, barcode scanning, and imaging of biological materials such as tissues and cells. An additional example of imaging includes examination of very small scale electronic circuits that generate small-scale electric field distributions. The intensity of harmonic radiation generated from an exposed focused wave high amplitude region of the circuit is sensitive to the magnitude of the local electric fields in the vicinity of the exposed region. By monitoring the harmonic radiation generated from the electronic circuit, an imaging system according to the invention could be used to obtain a subwavelength resolution image of the circuit.

The imaging system according to the invention comprises at least one wave focusing apparatus 1, wherein each apparatus directs at least two wave sources 50 to a high amplitude region 30 of a sample 150. The imaging system also includes a detector 152 to detect radiation 154 from the high amplitude region 30 of the sample 150 and to generate an image of the sample based on the detected radiation. The image generated by the imaging system will have a minimum feature size corresponding to the dimension 83 of the high amplitude region in the plane of the sample 150.

The imaging system may optionally include a translator 160 to move the high amplitude region 30 throughout the sample 150. The translator 160 may operate, for example, to move either the wave focusing apparatus 1 and the detector 152, the sample 150, or any combination of the focusing apparatus, detector and sample in a coordinated fashion. The imaging system may further include a primary wave source and at least one splitter to divide the primary wave source into at least two wave sources for each focusing apparatus 1 employed in the imaging system. FIG. 16 shows such an imaging system, in which a sample 150 is exposed to a focused high amplitude region 30, and a detector 152 detects radiation 154 emitted from the high amplitude region of the sample in a direction from which the wave sources 50 are incident. FIG. 17 shows another configuration of the fourth embodiment, in which the detector 152 is arranged so as to detect radiation 154 emitted from the sample 150 on a side opposite to that on which the focused waves 50 are incident.

As described in connection with the first embodiment of the invention, any of the wave sources or the primary wave source of the imaging system may include a spatial pattern to produce a corresponding pattern in the high amplitude region 30. The corresponding pattern may be a plurality of discrete high amplitude subregions within the high amplitude region. The imaging system may further include one or more spatial modulators to modulate the spatial pattern of any of the sources or the primary wave source so that at least one high amplitude subregion may be positioned throughout the high amplitude region. Furthermore, the imaging system may employ one or more wave focusing apparatus, such as, for example the two head-to-head wave focusing apparatus shown in FIG. 14, to produce a volumetric high amplitude region 30 in the shape of a sphere. In this case, the detector 152 may be positioned according to either FIG. 15 or 16.

FIG. 18 shows a particular example of the imaging system according to the fourth embodiment of the invention used to detect surface profile features of a sample 150. The use of a high intensity primary wave source for the wave focusing apparatus of the imaging system provides an imaging system that can be based on nonlinear processes occurring in the sample 150 within the high amplitude region 30. For example, in the imaging system shown in FIG. 18, a signal indicating the presence of a microstructure 170 on the surface of the sample 150 can be obtained from surface second harmonic generation of the incident multiple beams 50. Second harmonic waves having a frequency of twice the center frequency of the sources 50 will be generated predominantly in the high amplitude region 30, where the wave intensity is much higher than in the surrounding regions. Such an imaging system could be used, for example, in rapid high-resolution inspection of lithographic masks.

The imaging system according to the invention would also find use in microscopy applications. Such applications include high resolution inspection of any material, including high resolution imaging of biological materials. The detector 152 of the imaging system measures radiation scattered from the high amplitude region 30 of a sample 150 or radiation which has been re-emitted by the sample at some time after the absorption of the focused radiation in the high amplitude region 30. Such fluorescence or phosphorescence microscopy can involve linear or nonlinear processes which locally excite internal degrees of freedom of the sample medium, such as, for example, multiphoton absorption or the nonlinear Raman effect. Different microscopy applications may benefit from either a large or small depth of focus of the high amplitude region, and the wave focusing apparatus of the imaging system may be configured accordingly, as discussed in connection with FIG. 14.

For optical imaging systems according to the invention in which the primary wave source outputs laser beam pulses having a duration of up to approximately ten picoseconds, Cherenkov radiation emitted by the sample 150 can serve as a signal in microscopy. As the high bandwidth pulses of the wave focusing apparatus cross through the high amplitude region 30 of the sample 150, the coherently combined radiation propagates through the region 30 at a speed that is apparently greater than the speed of light in the sample medium. This effect induces a nonlinear polarization in the sample that in turn generates Cherenkov radiation. This radiation can be detected by the detector 152 of the imaging system as a signal from which the material properties of an irradiation volume with subwavelength dimensions can be inferred, thereby allowing a high resolution image of the material to be constructed.

Figure 19:
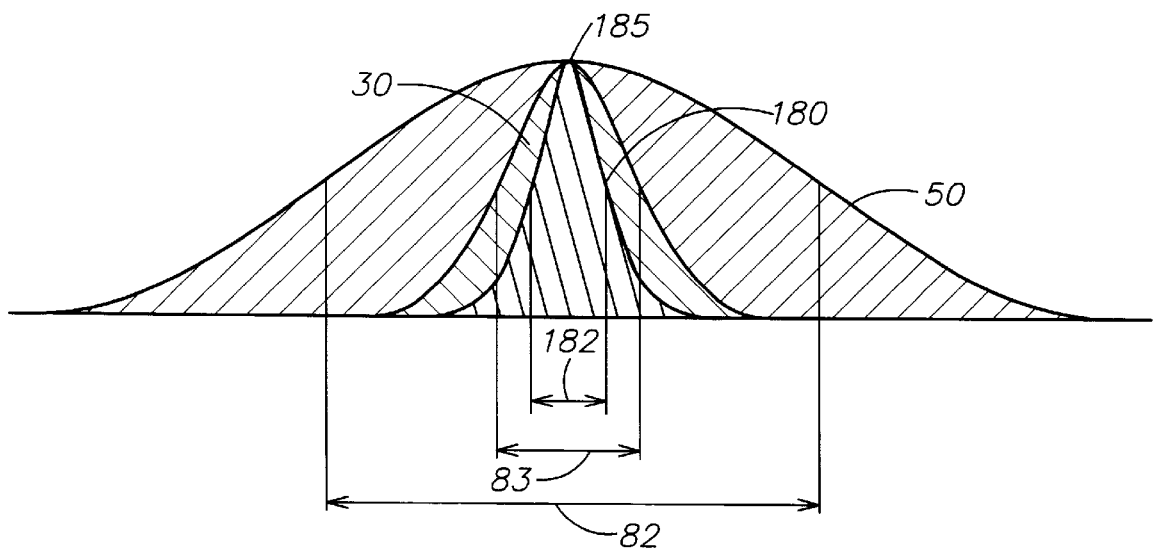
FIG. 19 is an illustration comparing the relative spot size profiles of the individual wave sources, the central high amplitude region, and a sample nonlinear interaction region in the imaging and material patterning systems of FIGS. 15–18 utilizing wave sources having a high intensity.

FIG. 19 shows a sample region of exposure 180 for both the imaging system and material patterning system of the invention when the intensity of the wave sources 50 of the wave focusing apparatus is such that a nonlinear process occurs in the material of the sample. Since such nonlinear processes are a function of the intensity of the sources impinging on the sample, the actual region of exposure 180 where the nonlinear process will occur is confined to a region only around the most intense peak 185 of the high amplitude region 30. The actual spot size 182 of the region of the nonlinear process 180 is thus smaller than the spot size 83 of the high amplitude region 30.

For reference, the diffraction limited spot size 82 of source beams 50 is also shown in FIG. 19. The further reduced spot size 182 of the exposure region 180 is a function of the nonlinearity of the process, wherein the spot size 182 is reduced from the spot size 83 of the high amplitude region 30 by a factor of $1/\sqrt{n}$, where n represents the process nonlinearity. As a result, further dramatic reduction in spot size may be achieved in samples having significant nonlinear response to high intensity wave sources.

Figure 20:
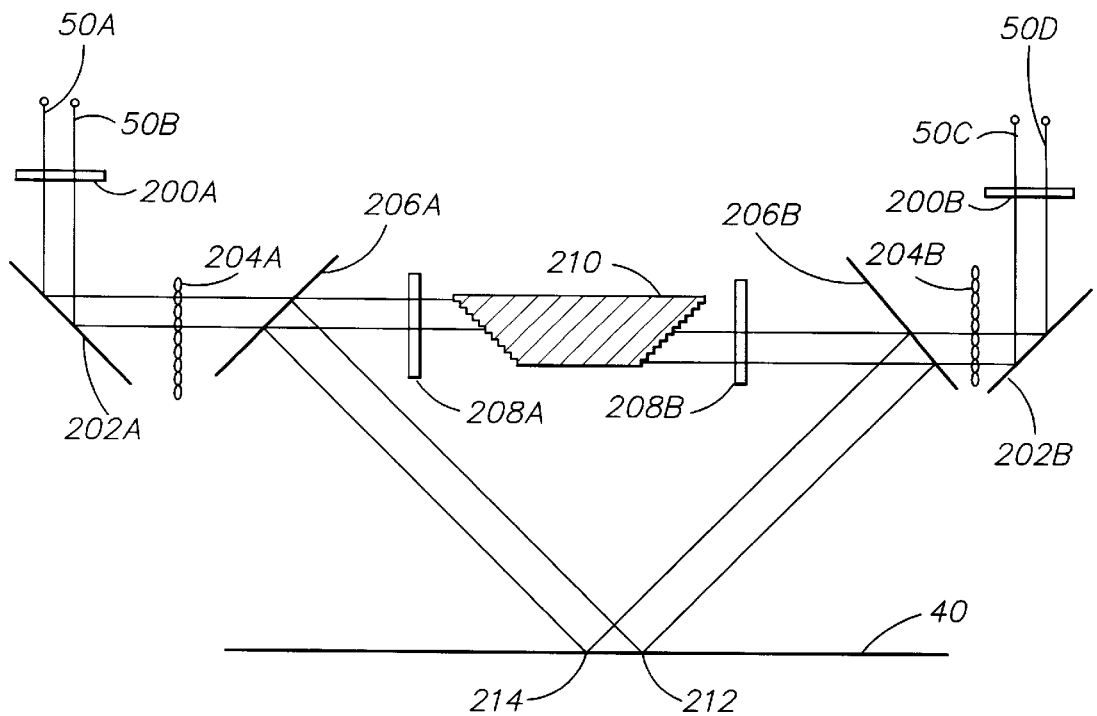
FIGS. 20 and 21 are schematic diagrams of a patterning system and an imaging system respectively for still another embodiment of the invention.
Figure 21:
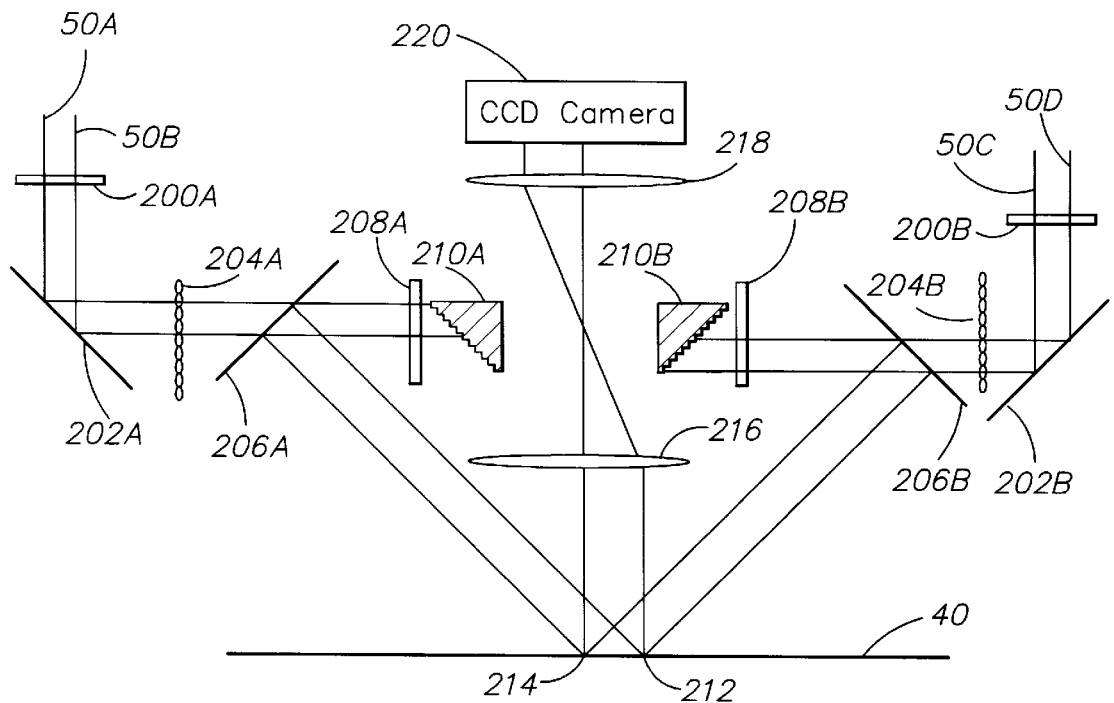

FIGS. 20 and 21 illustrate still another embodiment of the invention wherein each of the waves 50 is divided into a spatial array of contiguous subwaves or wavelets 50A, 50B, 50C, 50D having a spacing which is substantially larger than the wavelength of the wave. As for previous embodiments, the wavelets are all in phase. Each wavelet 50 passes through a corresponding shutter array 200A, 200B, to an angled mirror 202A, 202B, which mirror deflects the beam by 90°. Shutter array 200 may, for example, be small movable mirrors, liquid crystal arrays or other optical components which may be selectively controlled, preferably electrically, so as to selectively pass or block each individual wavelet 50. Wavelets leaving mirrors 202 pass through microlens arrays 204A, 204B, through polarization sensitive mirrors 206A, 206B, and through quarter wave plates 208A, 208B, to the stepped surface of a echelle grating 210. The initial polarization of wavelets 50 is such that they are highly transmitted by mirrors 206. There should be a step on grating 210 for each wavelet 50 incident thereon. Each wavelet is reflected by grating 210 back through the corresponding quarter wave plate 208 to the corresponding mirror 206. Since each wave undergoes a half wave transformation as a result of the two passages through the corresponding plate 208, their polarization is such that mirrors 206 reflect the wavelets toward focus surface 40. At this surface, wavelet 50A is combined with wavelet 50C at point 212 and wavelet 50B is combined with wavelet 50D at point 214. The components are arranged such that the lengths of the propagation path for each of the wavelets 50 from its origination point to its termination point 212, 214 at plane 40 are equal. Thus, an intense spot 30 is formed at each of these points which may be used for the parallel imaging of points in the various patterning applications previously indicated. While only two wavelets for each of two waves are shown in FIG. 20, it is apparent that many additional wavelets may be provided, limited primarily by the number of steps on echelle grating 210, such steps being on the order of ten steps per millimeter for an illustrative embodiment for optical waves. This permits a large number of points on plane 40 to be simultaneously imaged. Further, wavelets 50 may exist in multiple planes, only one of which is shown in FIG. 20, permitting plane 40 to be imaged in two dimensions rather than only a single dimension as shown. Imaging in multiple dimensions may be achieved either by having grating 210 extending for a selected length into an out of FIG. 20, by having gratings formed on four or more sides, or a combination thereof. With gratings formed on multiple sides of echelle grating 210, wavelets may arrive at grating 210, and this at plane 40 from multiple angles. The depth of focus profile for this embodiment of the invention may also be shaped by providing multiple focusing systems of the type shown in FIG. 20, as for example the focusing systems 1 shown in FIG. 14.

Finally, shutter elements of arrays 200 permit the points being imaged to be selectively controlled in one or two dimensions to permit the parallel recording of a variety of different patterns on plane 40 by independently turning on and off the points 212, 214. Normally the two beams 50 meeting at a point 212, 214 would be simultaneously blocked or passed by corresponding shutters of arrays 200A, 200B to achieve this selective patterning.

FIG. 21 shows an alternative embodiment which differs from FIG. 20 in that the echelle grating 210 is split into two parts, 210A, 210B, with radiation, for example second harmonic radiation, emitted from each of the points 212, 214, being passed through suitable lenses 216, 218 and through the space between the echelle grating segments to impinge on a CCD camera 220 or other suitable imaging media. The arrangement of FIG. 21 may be utilized for semiconductor mask inspection, biological microscopy or for other applications requiring precise imaging, where such imaging can be more quickly or more accurately obtained in parallel rather than in series. Parallel imaging is particularly advantageous where plane 40 may be undergoing vibration or other movement.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting.

What is claimed is:

1. Apparatus for wave focusing to a central high amplitude region, comprising:

at least two wave sources having constant phase relationships with each other, each source outputting wave packets and having a wavevector corresponding to a direction of propagation of the wave packets; and a focusing system to combine the wave packets, the focusing system directing each source to the central high amplitude region and coherently combining the wave packets in the central high amplitude region, wherein the wave packets have a sufficient bandwidth so as to substantially reduce secondary high amplitude regions in a vicinity of the central high amplitude region.

2. The apparatus of claim 1, wherein the wave packets have a center frequency, and the sufficient bandwidth is greater than 0.05 times the center frequency.

3. The apparatus of claim 1, wherein the focusing system includes an arrangement of dispersive elements to spatially redistribute a spectrum of the sources so as to reduce the sufficient bandwidth.

4. The apparatus of claim 3, wherein the dispersive elements are prisms.

5. The apparatus of claim 1, wherein:

the central high amplitude region includes a focal plane normal to a nonzero vector sum of the wavevectors; and the wavevector of each source intercepts the focal plane at a nonzero incident angle with respect to the nonzero vector sum; and the nonzero incident angle of each source is such that a spatial redistribution of a spectrum of the sources reduces the sufficient bandwidth.

6. The apparatus of claim 5, wherein the nonzero incident angles of the at least two sources are substantially equal.

7. The apparatus of claim 1, wherein at least one wave source includes a spatial pattern so that a corresponding pattern is produced in the central high amplitude region.

8. The apparatus of claim 7, wherein:

at least two wave sources each include a spatial pattern; and the spatial pattern of each source is different.

9. The apparatus of claim 8, further including a spatial modulator to modulate the spatial pattern of at least one of the sources so that at least one high amplitude subregion is moved within the central high amplitude region.

10. The apparatus of claim 7, wherein the spatial pattern is such that the corresponding pattern is a plurality of discrete high amplitude subregions within the central high amplitude region.

11. The apparatus of claim 1, further including:

a primary wave source outputting wave packets having a bandwidth; and at least one splitter to divide the primary wave source into the at least two wave sources.

12. The apparatus of claim 11, wherein the at least one splitter and the focusing system are arranged so that the wave packets of each source travel an identical path length to the central high amplitude region.

13. The apparatus of claim 11, wherein the primary wave source includes a spatial pattern so that a corresponding pattern is produced in the central high amplitude region.

14. The apparatus of claim 13, wherein the spatial pattern is such that the corresponding pattern is a plurality of discrete high amplitude subregions within the central high amplitude region.

15. The apparatus of claim 13, further including a spatial modulator to modulate the spatial pattern so that at least one high amplitude subregion is moved within the central high amplitude region.

16. The apparatus of claim 11, wherein the primary wave source has a Gaussian spatial profile.

17. The apparatus of claim 16, wherein the primary wave source is a laser.

18. The apparatus of claim 17, wherein the wave packets are pulses having a duration of up to approximately ten picoseconds.

19. The apparatus of claim 18, wherein each pulse is a chirped pulse.

20. The apparatus of claim 17, wherein:

the central high amplitude region includes a focal plane normal to a nonzero vector sum of the wavevectors;

each source has an electric field polarization; and the electric field polarization is selected such that a composite field of all of the sources in the central high amplitude region has a maximized electromagnetic interaction with a medium of the focal plane in a region thereof.

21. A system for wave focusing to a central high amplitude region, comprising at least two apparatus, each apparatus including:

at least two wave sources having constant phase relationships with each other, each source outputting wave packets and having a wavevector corresponding to a direction of propagation of the wave packets; and a focusing system to combine the wave packets, the focusing system directing each source to the central high amplitude region and coherently combining the wave packets in the central high amplitude region, wherein the wave packets have a sufficient bandwidth so as to substantially reduce secondary high amplitude regions in a vicinity of the central high amplitude region.

22. The wave focusing system of claim 21, wherein:

the at least two wave focusing apparatus include a first and second wave focusing apparatus;

a first vector sum of the wavevectors of the first apparatus is nonzero;

a second vector sum of the wavevectors of the second apparatus is nonzero;

a focal plane of the central high amplitude region is normal to both the first and second vector sums;

the second apparatus is arranged such that the first and second vector sums add to zero; and the focusing system of each apparatus is arranged such that the wave packets of all of the sources of both apparatus are coherently combined in the central high amplitude region.

23. The apparatus of claim 21, further including:

a primary wave source; and at least one splitter to divide the primary wave source into the at least two wave sources of each apparatus.

24. The apparatus of claim 23, wherein the primary wave source is a laser beam pulse source having a duration of up to approximately ten picoseconds.

25. A material patterning system for wave focusing to a central high amplitude region of a sample, comprising:

at least one wave focusing apparatus, each apparatus including:

at least two wave sources having constant phase relationships with each other, each source outputting wave packets and having a wavevector corresponding to a direction of propagation of the wave packets; and a focusing system to combine the wave packets, the focusing system directing each source to the central high amplitude region and coherently combining the wave packets in the central high amplitude region, wherein the wave packets have a sufficient bandwidth so as to substantially reduce secondary high amplitude regions in a vicinity of the central high amplitude region, wherein the central high amplitude region has a first focal dimension in a focal plane, the focal plane being normal to one of a vector sum of the wavevectors for each source if the vector sum is nonzero and the wavevectors for each source if the vector sum is zero; and a translator to selectively position the central high amplitude region with respect to the sample in a desired pattern so that portions of the sample exposed to the desired pattern are materially changed, wherein the exposed portions have a minimum feature size corresponding to the first focal dimension.

26. The material patterning system of claim 25, wherein at least one wave source of the at least one wave focusing apparatus includes a spatial pattern so that a corresponding pattern is produced in the central high amplitude region.

27. The material patterning system of claim 25, further including:

a primary wave source; and at least one splitter to divide the primary wave source into the at least two wave sources for each of the at least one wave focusing apparatus.

28. The material patterning system of claim 27, wherein the primary wave source includes a spatial pattern so that a corresponding pattern is produced in the central high amplitude region.

29. The material patterning system of claim 28, wherein the spatial pattern is such that the corresponding pattern is a plurality of discrete high amplitude subregions within the high amplitude region.

30. The material patterning system of claim 28, further including a spatial modulator to modulate the spatial pattern so that at least one high amplitude subregion is moved within the high amplitude region.

31. The material patterning system of claim 27, wherein the primary wave source has a high intensity such that the material change is a nonlinear function of the high intensity.

32. The material patterning system of claim 31, wherein the primary wave source is a laser beam pulse source having a duration of up to approximately ten picoseconds.

33. The material patterning system of claim 25, wherein:

the at least one wave focusing apparatus includes a first and second wave focusing apparatus, the source waves of each apparatus having constant phase relationships;

a first vector sum of the wavevectors of the first apparatus is nonzero;

a second vector sum of the wavevectors of the second apparatus is nonzero;

the focal plane is normal to both the first and second vector sums;

the second apparatus is arranged such that the first and second vector sums add to zero;

the focusing system of each apparatus is arranged such that the wave packets of all of the sources of both apparatus are coherently combined in the central high amplitude region;

the central high amplitude region has a second focal dimension in a plane normal to the focal plane; and the minimum feature size corresponds to one of the first and second focal dimensions.

34. An imaging system for wave focusing to a central high amplitude region of a sample, comprising:

at least one wave focusing apparatus, each apparatus including:

at least two wave sources having constant phase relationships with each other, each source outputting wave packets and having a wavevector corresponding to a direction of propagation of the wave packets; and a focusing system to combine the wave packets, the focusing system directing each source to the central high amplitude region and coherently combining the wave packets in the central high amplitude region, wherein the wave packets have a sufficient bandwidth so as to substantially reduce secondary high amplitude regions in a vicinity of the central high amplitude region, wherein the central high amplitude region has a first focal dimension in a focal plane, the focal plane being normal to one of a vector sum of the wavevectors for each source if the vector sum is nonzero and the wavevectors for each source if the vector sum is zero; and a detector to detect radiation from the central high amplitude region of the sample and to generate an image of the sample based on the detected radiation, wherein the image has a minimum feature size corresponding to the first focal dimension.

35. The imaging system of claim 34, further including a translator to move the central high amplitude region throughout the sample in a desired pattern.

36. The imaging system of claim 34, wherein at least one wave source of the at least one wave focusing apparatus includes a spatial pattern so that a corresponding pattern is produced in the central high amplitude region.

37. The imaging system of claim 34, further including:
   a primary wave source; and
   at least one splitter to divide the primary wave source into the at least two wave sources for each of the at least one wave focusing apparatus.

38. The imaging system of claim 37, wherein the primary wave source includes a spatial pattern so that a corresponding pattern is produced in the central high amplitude region.

39. The imaging system of claim 38, wherein the spatial pattern is such that the corresponding pattern is a plurality of discrete high amplitude subregions within the central high amplitude region.

40. The imaging system of claim 38, further including a spatial modulator to modulate the spatial pattern so that at least one high amplitude subregion is moved within the central high amplitude region.

41. The imaging system of claim 37, wherein the primary wave source has a center frequency and a high intensity such that a detected frequency of the detected radiation is a harmonic of the center frequency.

42. The imaging system of claim 41, wherein the primary wave source is a laser beam pulse source having a duration of up to approximately ten picoseconds.

43. The imaging system of claim 42, wherein each pulse is a differently chirped pulse.

44. The imaging system of claim 42, wherein consecutive laser beam pulses are differently delayed with respect to one another.

45. The imaging system of claim 34, wherein:
   the at least one wave focusing apparatus includes a first and second wave focusing apparatus, the source waves of each apparatus having constant phase relationships;
   a first vector sum of the wavevectors of the first apparatus is nonzero;
   a second vector sum of the wavevectors of the second apparatus is nonzero;
   the focal plane is normal to both the first and second vector sums;
   the second apparatus is arranged such that the first and second vector sums add to zero;
   the focusing system of each apparatus is arranged such that the wave packets of all of the sources of both apparatus are coherently combined in the central high amplitude region;
   the central high amplitude region has a second focal dimension in a plane normal to the focal plane; and
   the minimum feature size corresponds to one of the first and second focal dimensions.

46. A method for focusing a wave to a central high amplitude region, comprising steps of:
   directing at least two wave sources to the central high amplitude region; and
   coherently combining wave packets from the at least two wave sources in the central high amplitude region, wherein the sources have a sufficient bandwidth so as to substantially reduce secondary high amplitude regions in a vicinity of the central high amplitude region.

47. The method of claim 46, wherein the step of coherently combining includes a step of spatially redistributing a spectrum of the sources so that the sufficient bandwidth is reduced.

48. The method of claim 46, wherein the step of spatially redistributing includes a step of passing the sources through an arrangement of dispersive elements.

49. The method of claim 46, wherein the wave packets have a center frequency, and the sufficient bandwidth is greater than 0.05 times the center frequency.

50. The method of claim 46, further including a step of patterning a spatial profile of at least one of the at least two wave sources so that a corresponding pattern is produced in the central high amplitude region.

51. The method of claim 46, wherein the step of directing includes a step of passing the wave packets of the wave sources through a focusing system.

52. The method of claim 51, wherein the step of passing includes a step of passing the wave packets of each of the at least two wave sources through a discrete focusing component.

53. The method of claim 51, wherein the step of coherently combining includes a step of splitting a primary wave source into the at least two wave sources.

54. The method of claim 53, wherein the step of coherently combining includes a step of arranging the wave sources and the focusing system so that the wave packets travel an identical path length to the central high amplitude region.

55. The method of claim 53, wherein the step of coherently combining includes a step of arranging the wave sources and the focusing system so that the wave packets of each source intersect a focal plane of the high amplitude region at an angle with respect to a normal to the focal plane, such that a spatial redistribution of a spectrum of the sources reduces the sufficient bandwidth.

56. The method of claim 55, wherein the angle is substantially equal for each wave source.

57. The method of claim 53, further including a step of patterning a spatial profile of the primary wave source so that a corresponding pattern is produced in the central high amplitude region.

58. The method of claim 57, wherein the step of patterning includes a step of spatially modulating a spatial profile pattern of the primary source wave so that at least one high amplitude subregion is moved within the central high amplitude region.

59. A method of patterning a sample, comprising steps of:
   directing at least two wave sources to the central high amplitude region;
   coherently combining wave packets from the at least two wave sources in the central high amplitude region, wherein the sources have a sufficient bandwidth so as to substantially reduce secondary high amplitude regions in a vicinity of the central high amplitude region; and
   translating the central high amplitude region throughout the sample in a desired pattern so that portions of the sample exposed to the desired pattern are materially changed.

60. The method of claim 59, further including a step of patterning a spatial profile of at least one of the at least two wave sources so that a corresponding pattern is produced in the central high amplitude region.

61. The method of claim 59, wherein the step of coherently combining includes a step of splitting a primary wave source into the at least two wave sources.

62. The method of claim 61, further including a step of patterning a spatial profile of the primary wave source so that a corresponding pattern is produced in the central high amplitude region.

63. The method of claim 62, wherein the step of patterning includes a step of spatially modulating a spatial profile pattern of the primary source wave so that at least one high amplitude subregion is moved within the central high amplitude region.

64. A method of imaging a sample, comprising steps of:
directing at least two wave sources to the central high amplitude region;
coherently combining wave packets from the at least two wave sources in the central high amplitude region, wherein the sources have a sufficient bandwidth so as to substantially reduce secondary high amplitude regions in a vicinity of the central high amplitude region;
detecting radiation from the central high amplitude region of the sample; and
generating an image of the sample based on the detected radiation.

65. The method of claim 64, further including a step of translating the central high amplitude region throughout the sample in a desired pattern.

66. The method of claim 64, further including a step of patterning a spatial profile of at least one of the at least two wave sources so that a corresponding pattern is produced in the central high amplitude region.

67. The method of claim 64, wherein the step of coherently combining includes a step of splitting a primary wave source into the at least two wave sources.

68. The method of claim 67, further including a step of patterning a spatial profile of the primary wave source so that a corresponding pattern is produced in the central high amplitude region.

69. The method of claim 68, wherein the step of patterning includes a step of spatially modulating a spatial profile pattern of the primary source wave so that at least one high amplitude subregion is moved within the central high amplitude region.

70. The method of claim 67, wherein the primary wave source is a laser beam pulse having a duration of up to approximately ten picoseconds.

71. The method of claim 70, wherein the step of detecting further includes steps of:
differently chirping each laser beam pulse; and
detecting a radiation signature from the central high amplitude region of the sample associated with the differently chirped pulses.

72. The method of claim 70, wherein the step of detecting further includes steps of:
differently delaying consecutive laser beam pulses with respect to one another; and
detecting a radiation signature from the central high amplitude region of the sample associated with the differently delayed pulses.

73. Apparatus for wave focusing to a plurality of high amplitude regions in a focal plane comprising:
at least two wave sources having constant phase relationships with each other, each source outputting a plurality of spaced wavelets, the wavelets from each source having parallel directions of propagation;
a focusing system to coherently combine corresponding wavelets from at least two of said sources, each such coherently combined wavelets being focused to a said high amplitude region, the wavelets having a sufficient bandwidth so as to substantially reduce secondary high amplitude regions in a vicinity of each said high amplitude region.

74. Apparatus of claim 73 wherein the path lengths for said wavelets from entry to said focusing system to a said high amplitude region are substantially equal.

75. Apparatus of claim 73 including a shutter array for each wave source, said shutter arrays being controlled to create a selected pattern of said high amplitude regions on said focal plane.

76. Apparatus of claim 73 including a detector for emissions for said high amplitude regions to provide selective imaging of said focal plane.

* * * * *